(12) United States Patent
Carroll et al.

(10) Patent No.: US 9,555,610 B2
(45) Date of Patent: Jan. 31, 2017

(54) LED LIGHT BULB WITH INTERNAL FLEXIBLE HEATSINK AND CIRCUIT

(71) Applicant: Forever Bulb, LLC, Grantsburg, WI (US)

(72) Inventors: David W. Carroll, Grantsburg, WI (US); Wendell Carroll, Minneapolis, MN (US); Bruce Johnson, Saint Paul, MN (US)

(73) Assignee: Forever Bulb, LLC, Grantsburg, WI (US)

( * ) Notice: Subject to any disclaimer, the term of this patent is extended or adjusted under 35 U.S.C. 154(b) by 10 days.

(21) Appl. No.: 14/643,374

(22) Filed: Mar. 10, 2015

(65) Prior Publication Data
US 2015/0252956 A1    Sep. 10, 2015

Related U.S. Application Data

(60) Provisional application No. 61/950,669, filed on Mar. 10, 2014, provisional application No. 61/951,341, (Continued)

(51) Int. Cl.
*F21S 4/00* (2016.01)
*B32B 38/18* (2006.01)
(Continued)

(52) U.S. Cl.
CPC .................. *B32B 38/18* (2013.01); *F21K 9/23* (2016.08); *F21K 9/232* (2016.08); *F21K 9/90* (2013.01);
(Continued)

(58) Field of Classification Search
CPC .......... F21K 9/13; F21K 9/135; F21K 9/1355; F21S 4/22; F21S 4/24; F21V 19/006
See application file for complete search history.

(56) References Cited

U.S. PATENT DOCUMENTS 5,769,533 A    6/1998  Yamuro et al.
6,523,978 B1   2/2003  Huang
(Continued)

FOREIGN PATENT DOCUMENTS

EP    2472170      7/2012
WO    2009122453   10/2009
(Continued)

OTHER PUBLICATIONS

Invitation to Pay Additional Fees with Partial Search Report for related Application No. PCT/US2015/019651 mailed Jun. 3, 2015.

*Primary Examiner* — Julie Bannan
(74) *Attorney, Agent, or Firm* — Dicke, Billig & Czaja, PLLC

(57) ABSTRACT

An LED light bulb device that includes a bulb body, a plurality of flexible circuit strips, and at least one LED. The flexible circuit strips are formed to a shape of, and adhered directly to, an interior face of the bulb body. At least one of the flexible circuit strips defines a plurality of stress-relieving notches. At least one LED is mounted to a corresponding one of the flexible circuit strips and is electrically connected to a conductive trace formed by the flexible circuit strip. The LEDs are arranged to aim inwardly relative to the bulb body. In some embodiments, a rear surface of each of the flexible circuit strips is adhesively attached to the interior face of the bulb body. In some embodiments, a plurality of LEDs are provided and arranged to provide one or both of uniform light distribution and diverse heat distribution.

19 Claims, 15 Drawing Sheets

Related U.S. Application Data filed on Mar. 11, 2014, provisional application No. 61/987,259, filed on May 1, 2014.

(51) Int. Cl.

| | | |
|---|---|---|
| *F21K 99/00* | (2016.01) | |
| *F21V 19/00* | (2006.01) | |
| *F21V 23/06* | (2006.01) | |
| *F21V 23/02* | (2006.01) | |
| *F21V 29/70* | (2015.01) | |
| *G09F 13/22* | (2006.01) | |
| *F21Y 101/00* | (2016.01) | |

(52) U.S. Cl.
CPC .......... *F21V 19/005* (2013.01); *F21V 23/026* (2013.01); *F21V 23/06* (2013.01); *F21V 29/70* (2015.01); *G09F 13/22* (2013.01); *F21S 4/22* (2016.01); *F21Y 2101/00* (2013.01); *F21Y 2103/10* (2016.08); *F21Y 2107/00* (2016.08); *F21Y 2115/10* (2016.08); *G09F 2013/222* (2013.01); *Y10T 29/49117* (2015.01); *Y10T 156/1043* (2015.01)

(56) References Cited

U.S. PATENT DOCUMENTS

| | | | |
|---|---|---|---|
| 6,580,228 B1 | 6/2003 | Chen et al. | |
| 6,676,274 B1* | 1/2004 | Rafferty | F21S 8/035 362/276 |
| 6,709,132 B2 | 3/2004 | Ishibashi | |
| 7,086,756 B2 | 8/2006 | Maxik | |
| 7,086,767 B2 | 8/2006 | Sidwell et al. | |
| 7,210,818 B2 | 5/2007 | Luk et al. | |
| 7,284,894 B2 | 10/2007 | Mok et al. | |
| 7,354,174 B1 | 4/2008 | Yan | |
| 7,396,142 B2 | 7/2008 | Laizure, Jr. et al. | |
| 7,407,304 B2 | 8/2008 | Tasson et al. | |
| 7,726,836 B2 | 6/2010 | Chen | |
| 7,736,020 B2 | 6/2010 | Baroky et al. | |
| 7,810,974 B2 | 10/2010 | Van Rijswick et al. | |
| 7,883,242 B2 | 2/2011 | Ng et al. | |
| 8,013,501 B2 | 9/2011 | Carroll et al. | |
| 8,075,172 B2 | 12/2011 | Davey et al. | |
| 8,079,735 B1 | 12/2011 | Vakil et al. | |
| 8,100,553 B2 | 1/2012 | Chen et al. | |
| D654,602 S | 2/2012 | Carroll et al. | |
| D664,684 S | 7/2012 | Carroll et al. | |
| D664,685 S | 7/2012 | Carroll et al. | |
| 8,210,718 B2 | 7/2012 | Tsai et al. | |
| 8,314,566 B2 | 11/2012 | Steele et al. | |
| 8,322,882 B2 | 12/2012 | Ward | |
| 8,360,608 B2 | 1/2013 | Wildner | |
| 8,371,722 B2 | 2/2013 | Carroll | |
| 8,410,726 B2 | 4/2013 | Dau et al. | |
| 8,536,807 B2 | 9/2013 | Lin et al. | |
| D691,290 S | 10/2013 | Carroll et al. | |
| 8,545,056 B2 | 10/2013 | Kajiya et al. | |
| 8,593,390 B2 | 11/2013 | Plötz et al. | |
| 8,622,578 B2 | 1/2014 | De Samber et al. | |
| 8,629,464 B2 | 1/2014 | Roberts | |
| 8,637,880 B2 | 1/2014 | Roberts | |
| D706,959 S | 6/2014 | Carroll et al. | |
| 8,746,927 B1 | 6/2014 | Nepple et al. | |
| D721,192 S | 1/2015 | Carroll et al. | |
| D721,193 S | 1/2015 | Carroll et al. | |
| D721,446 S | 1/2015 | Carroll et al. | |
| 8,926,130 B2* | 1/2015 | Li | F21V 29/2231 362/249.02 |
| 2001/0036082 A1* | 11/2001 | Kanesaka | |
| 2003/0031015 A1* | 2/2003 | Ishibashi | F21K 9/135 362/235 |
| 2004/0223328 A1* | 11/2004 | Lee | B60Q 1/2607 362/249.01 |
| 2004/0246704 A1* | 12/2004 | Burdick | H01R 13/465 362/95 |
| 2005/0174769 A1* | 8/2005 | Yong | F21K 9/135 362/235 |
| 2005/0207152 A1* | 9/2005 | Maxik | F21K 9/135 362/231 |
| 2006/0193130 A1* | 8/2006 | Ishibashi | F21K 9/135 362/227 |
| 2009/0302730 A1* | 12/2009 | Carroll | F21K 9/135 313/46 |
| 2011/0101842 A1* | 5/2011 | Valenzano | F21V 19/005 313/46 |
| 2011/0103055 A1* | 5/2011 | Carroll | F21K 9/135 362/235 |
| 2011/0163683 A1* | 7/2011 | Steele | F21K 9/135 315/192 |
| 2011/0188248 A1* | 8/2011 | Chang | F21V 19/0015 362/249.02 |
| 2011/0267812 A1* | 11/2011 | Van De Ven | F21K 9/00 362/235 |
| 2011/0299292 A1 | 12/2011 | Preuschl | |
| 2012/0026732 A1 | 2/2012 | Fricke | |
| 2012/0043878 A1* | 2/2012 | Liang | F21K 9/135 313/317 |
| 2012/0069556 A1 | 3/2012 | Bertram et al. | |
| 2012/0106153 A1 | 5/2012 | Huang et al. | |
| 2012/0169251 A1 | 7/2012 | Lai et al. | |
| 2012/0235173 A1* | 9/2012 | Roberts | F21V 29/74 257/88 |
| 2012/0238045 A1 | 9/2012 | Roberts | |
| 2012/0243230 A1 | 9/2012 | Carroll et al. | |
| 2012/0314431 A1* | 12/2012 | Lin | F21V 19/0045 362/382 |
| 2013/0010472 A1 | 1/2013 | Li et al. | |
| 2013/0021811 A1* | 1/2013 | Goldwater | F21S 4/22 362/473 |
| 2013/0027904 A1* | 1/2013 | Fan | F21V 29/004 362/84 |
| 2013/0070457 A1* | 3/2013 | Nishiuchi | F21K 9/23 362/235 |
| 2013/0271972 A1 | 10/2013 | Hussell et al. | |
| 2014/0191653 A1 | 7/2014 | Edmond et al. | |
| 2014/0319002 A1 | 10/2014 | Carroll et al. | |
| 2015/0003058 A1* | 1/2015 | Zhang | F21K 9/1355 362/235 |

FOREIGN PATENT DOCUMENTS

| | | |
|---|---|---|
| WO | 2011072465 | 6/2011 |
| WO | 2012148382 | 11/2012 |
| WO | 2014025933 | 2/2014 |

\* cited by examiner

LED LIGHT BULB WITH INTERNAL FLEXIBLE HEATSINK AND CIRCUIT

CROSS REFERENCE TO RELATED APPLICATIONS

This Non-Provisional patent application claims the benefit of the filing dates of U.S. Provisional Patent Application Ser. No. 61/950,669, filed Mar. 10, 2014, entitled "LED LIGHT BULB WITH INTERNAL FLEXIBLE CIRCUIT AND LEDS"; U.S. Provisional Patent Application Ser. No. 61/951,341, filed Mar. 11, 2014, entitled "LED LIGHT BULB WITH INTERNAL FLEXIBLE CIRCUIT AND LEDS"; and U.S. Provisional Patent Application Ser. No. 61/987,259, filed May 1, 2014, entitled "LED LIGHT BULB WITH INTERNAL FLEXIBLE CIRCUIT AND LEDS" the entire teachings of each of which are herein incorporated by reference.

BACKGROUND

The present disclosure relates to light emitting diode (LED) illuminating devices and methods, and more particularly, to LED-based light bulb solutions in a format akin to a common incandescent light bulb or lamp. As a point of reference, the terms "bulb" and "lamp" are used interchangeably throughout this specification.

Incandescent light bulb or lamp replacement solutions, such as compact fluorescent lights (CFLs) and LED bulbs, are becoming more widely used as the cost of energy increases. Unfortunately, aesthetic concerns exist for the "tubes" of the CFL format, and unusual shapes of many LED environmental solutions. Consumers and commercial concerns have existing fixtures or sockets that in many cases look unappealing with these new replacement bulb offerings. In many cases, consumers avoid doing what is environmentally and financially correct to maintain the appearance of the common incandescent bulb.

LED-based lights provide the longest lasting, and over time the lowest cost and most environmentally-friendly, solution for lighting. Two major problems have been the high initial cost per lumen and the directionality of the light emitted by LED bulbs. More recently, greatly improved LED-based bulb devices have been developed, arranging a number of individual LEDs relative to a bulb structure otherwise highly similar in appearance to a conventional incandescent light bulb (e.g., A-19 format). Several highly promising bulb devices incorporating this format are described in U.S. Pat. No. 8,013,501, the entire teachings of which are incorporated herein by reference. With these and similar designs, the bulb device is intended to be used with a conventional incandescent light bulb fixture or socket (delivering AC power from a power source). The bulb device carries or includes appropriate circuitry that converts the AC power at the fixture or socket to power appropriate for powering or driving the LEDs. The LEDs generate heat that must be removed. In this regard, the small size of the LED die emits substantial heat per unit area from the back of the LED package. LED bulb or lamp designs typically use relatively large metal heat sinks to transfer this heat to surrounding ambient air.

LED light bulb designs involve a complex set of tradeoffs between the selection and numbers of LED components, LED drive parameters, system thermal constraints, system lifetime and performance targets. All of these tradeoffs are made within limits of cost goals and a desire to approximate the appearance of a conventional incandescent bulb. Implementation difficulty increases with the luminosity output requirements of high watt equivalency solutions.

Design of power conversion systems to meet light output targets of 60 W, 75 W, 100 W equivalency will be increasingly challenging, requiring careful selection of components, circuit board design and thermal design. Transfer of system heat from both the conversion electronics and the LEDs is particularly challenging. Internally mounted LEDs and power conversion components must be mounted on substrates providing thermal paths where heat is conducted to external surfaces for convective transfer.

A related heat transfer issue in the realm of LED-based light bulb design is the heat transfer paths and related surface systems. Any acceptable design must transmit the heat in a manner that also avoids electronic hazard paths. Regulatory compliance safety testing includes subjecting the lamp to a series of very high transient voltages and confirming that the lamp design does not allow such events to reach human accessible surfaces in such a way as to pose a safety issue to users.

LED-based light bulb designs give rise to multiple heat transfer-related concerns. Any resolution of these problems will be well-received.

SUMMARY

Some aspects of the present disclosure are directed toward an LED light bulb device. The LED light bulb device includes a bulb body, a plurality of flexible circuit strips, and at least one LED. The flexible circuit strips are formed to a shape of, and adhered directly to, an interior face of the bulb body. At least one of the flexible circuit strips defines a plurality of stress-relieving notches. At least one LED is mounted to a corresponding one of the flexible circuit strips and is electrically connected to a conductive trace formed by the flexible circuit strip. The at least one LED is arranged to aim inwardly relative to the bulb body. The LED light bulb device is characterized by the absence of a metal heat sink body in direct contact with any of the flexible circuit strips immediately opposite the at least one LED carried by the flexible circuit strip. In some embodiments, each of the flexible circuit strips includes a thermally conductive structure defining a front surface and a rear surface; the LED is mounted to the front surface and the rear surface is adhesively attached to the interior face of the bulb body. In other embodiments, the flexible circuit strips have an elongated shape defining an axial centerline; the plurality of stress-relieving notches includes a first pair of notches that are aligned with one another relative to the centerline. In related embodiments, a second pair of notches is also provided, with a pad region and opposing foldable tabs being formed between the pairs of notches. In yet other embodiments, the LED light bulb device includes a plurality of LEDs maintained by a plurality of flexible circuit strips that are circumferentially spaced from one another relative to a circumference defined by the bulb body; in related embodiments, a spacing of the LEDs and the flexible circuit strips provides a light distribution in which at least 90% of luminous intensity measured values varies by no more than 25% from the average of all measured values (where luminous intensity is measured about a polar axis of the bulb body 22 shape in maximum increments of 22.5° from 0° to 180° about the polar axis and within each vertical plane, luminous intensity measurements are taken from 0° to 135° at 5° vertical angle increments (IES LM-79-08)).

Other aspects of the present disclosure are directed toward an LED light bulb device including a bulb body, a plurality of flexible circuit strips, and at least one LED. The flexible circuit strips are formed to a shape of, and adhered directly to, an interior face of the bulb body. At least one LED is mounted to a corresponding one of the flexible circuit strips and is electrically connected to a conductive trace formed by the flexible circuit strip. The at least one LED is arranged to aim inwardly relative to the bulb body. The LED light bulb device is characterized by the absence of a metal heat sink body in direct contact with any of the flexible circuit strips immediately opposite the at least one LED carried by the flexible circuit strip. Further, the LED light bulb device strips provides a light distribution in which at least 90% of luminous intensity measured values varies by no more than 25% from the average of all measured values (where luminous intensity is measured about a polar axis of the bulb body 22 shape in maximum increments of 22.5° from 0° to 180° about the polar axis and within each vertical plane, luminous intensity measurements are taken from 0° to 135° at 5° vertical angle increments (IES LM-79-08)).

Yet other aspects of the present disclosure are directed toward a method of making an LED light bulb device. The method includes providing a bulb body having an open end opposite a closed end. A plurality of flexible circuit strips is provided. Each of the flexible circuit strips defines a front surface and a rear surface. At least one LED is mounted to the front surface of a respective one of the flexible circuit strips. An adhesive is applied to the rear surface of each of the flexible circuit strips. The circuit strips are inserted into the open end of the bulb body. An expandable member, in a contracted state, is located between the circuit strips. The expandable member is expanded from the contracted state to an expanded state, directing the adhesive-bearing rear surface of each of the flexible circuit strips into attachment with an interior face of the bulb body. The expandable member is transitioned from the expanded state toward the contracted state and removed from the bulb body. Circuitry components are electrically connected to circuitry traces carried by the flexible circuit strips, and a closure is formed over the open end. In some embodiments, the closure includes a cap having exterior threads for threaded engagement with an electrical fixture socket.

DETAILED DESCRIPTION

Figure 1:
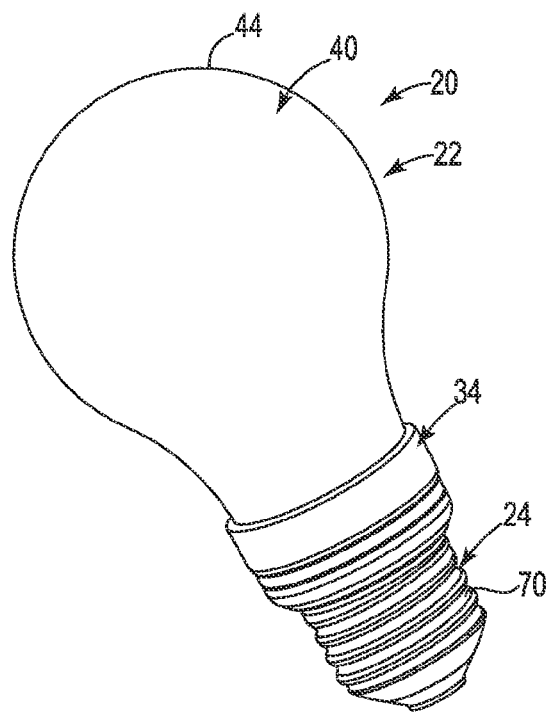
FIG. 1 is a perspective view of an LED light bulb device in accordance with principles of the present disclosure.
Figure 2:
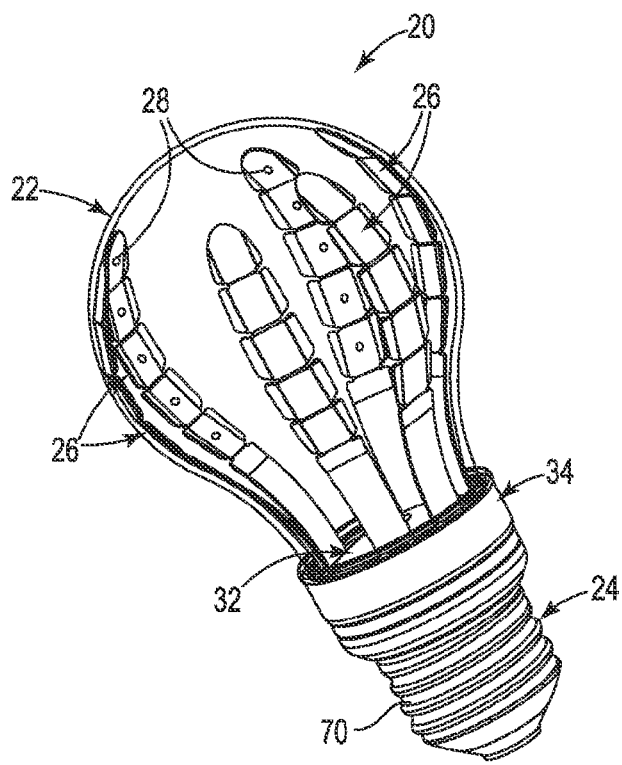
FIG. 2 is a perspective view of the light bulb device of FIG. 1 with portions drawn transparent.

One embodiment of an LED light bulb device 20 in accordance with principles of the present disclosure is shown in FIGS. 1-4. The device 20 includes a bulb body 22, a bulb base 24, one or more flexible circuit strips 26, LEDs 28, a power conversion circuitry assembly 30 (shown in FIG. 3), an optional isolation assembly 32 (referenced generally), and an optional heat sink ring 34. As a point of reference, the flexible circuit strips 26 and the LEDs 28 are located within the bulb body 22 and thus are "hidden" in the view of FIG. 1; the bulb body 22 is illustrated as transparent in FIG. 2 to reveal the flexible circuit strips 26 and several of the LEDs 28. While six of the flexible circuit strips 26 are shown, any other number, either greater or lesser, is equally acceptable. Details on the various components are provided below. In general terms, however, various ones of the LEDs 28 are mounted to respective ones of the flexible circuit strips 26. The flexible circuit strips 26, in turn, are formed and adhered to an interior face of the bulb body 22 so as to arrange the LEDs 28 to be inwardly-aiming. The flexible circuit strips 26 incorporate features that promote this assembly as described below. Further, the flexible circuit strips 26 are electrically connected to the power conversion circuitry assembly 30 that can be located within the optional isolation assembly 32. The bulb base 24 provides for threaded connection to a standard light bulb socket or fixture. When connected to, and energized by, a standard light bulb socket or fixture, power from the power circuitry assembly 30 is delivered to the LEDs 28 via the corresponding flexible circuit strip 26, causing the LED light bulb device 20 to emit light. Further, the flexible circuit strips 26 transfer heat generated by the corresponding LEDs 28 to the surrounding environment via the bulb body 22 as described below as well as through the optional heat sink ring 34 (when provided).

The bulb body 22 defines a shape that is akin to a "standard" or known AC bulb (e.g., an Edison incandescent light bulb or A-19 (per ANSI C78.20-2003 standards) format). The bulb body 22 can be formed of any material appropriate for use as a light bulb such as plastic or glass (e.g., clear or "frosted" glass or plastic) or other material. The bulb body 22 can have various shapes and sizes (e.g., pear shape (A19), rounded globe, pyramidal (flood light), candle-shaped, etc.).

Figure 4:
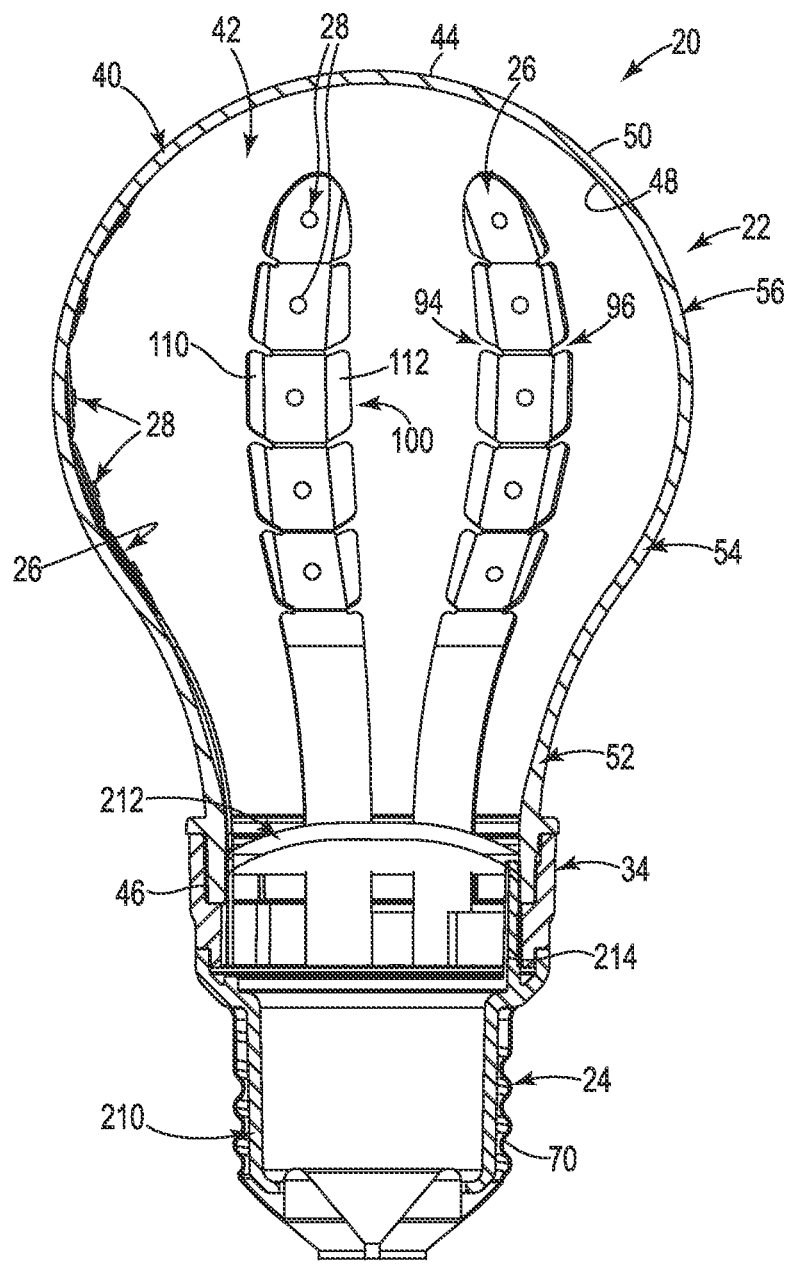
FIG. 4 is a longitudinal cross-sectional view of the light bulb device of FIG. 1.

As best shown in FIG. 4, in some embodiments, the bulb body 22 is formed as an integral, homogenous structure (e.g., a blow molded plastic) defined by a continuous bulb body wall 40 that forms an interior region 42. As a point of reference, in the various views, one or more horizontal contour lines or edges are illustrated along the bulb body 22; it will be understood that where the bulb body 22 is a homogeneous structure (e.g., a blow molded body), a discernible contour "line" or edge or seam will not exist. In other embodiments, the bulb body 22 can be formed by two or more separately formed and subsequently assembled sections. Regardless, the wall 40 can be viewed as a continuous structure, extending (longitudinally) between a closed top end 44 and an open lower end 46 that is otherwise open to the interior region 42. Thus, the wall 40 effectively encloses the interior region 42. Further, the wall 40 defines an interior face 48 opposite an exterior face 50. The exterior face 50 can have various curves or curvatures in longitudinal extension between the top and lower ends 44, 46. A thickness of the wall 40 can be uniform or substantially uniform, such that the curves or curvatures along the exterior face 50 are replicated at the interior face 48. Alternatively, a thickness of the wall 40 directly "behind" one or more of the LEDs 28 can be variable to enhance heat transfer. With embodiments in which the bulb body 22 has a shape akin to a conventional Edison light bulb (e.g., A-19 or pear shape), the interior face 48 can be viewed as forming the interior region 42 to have a neck region 52 with a slightly increasing diameter in extension from the lower end 46, a first bulbous region 54 along which the diameter of the interior region 42 more dramatically increases in extension from the neck region 52, and a second bulbous region 56 along which the diameter of the interior region 42 decreases in extension from the first bulbous region 54 to the closed top end 44. As described in greater detail below, it has been surprisingly found that the multiple, tight contours, compound curves, and nearly spherical surface regions along the interior face 48 as otherwise generated by the A-19 shape (or similar shapes commonly employed with light bulbs) present unique problems or obstacles to the application of a separate body on to the interior face 48 (e.g., the flexible circuit strips 26). Aspects of the present disclosure solve and overcome these problems and obstacles.

Figure 3:
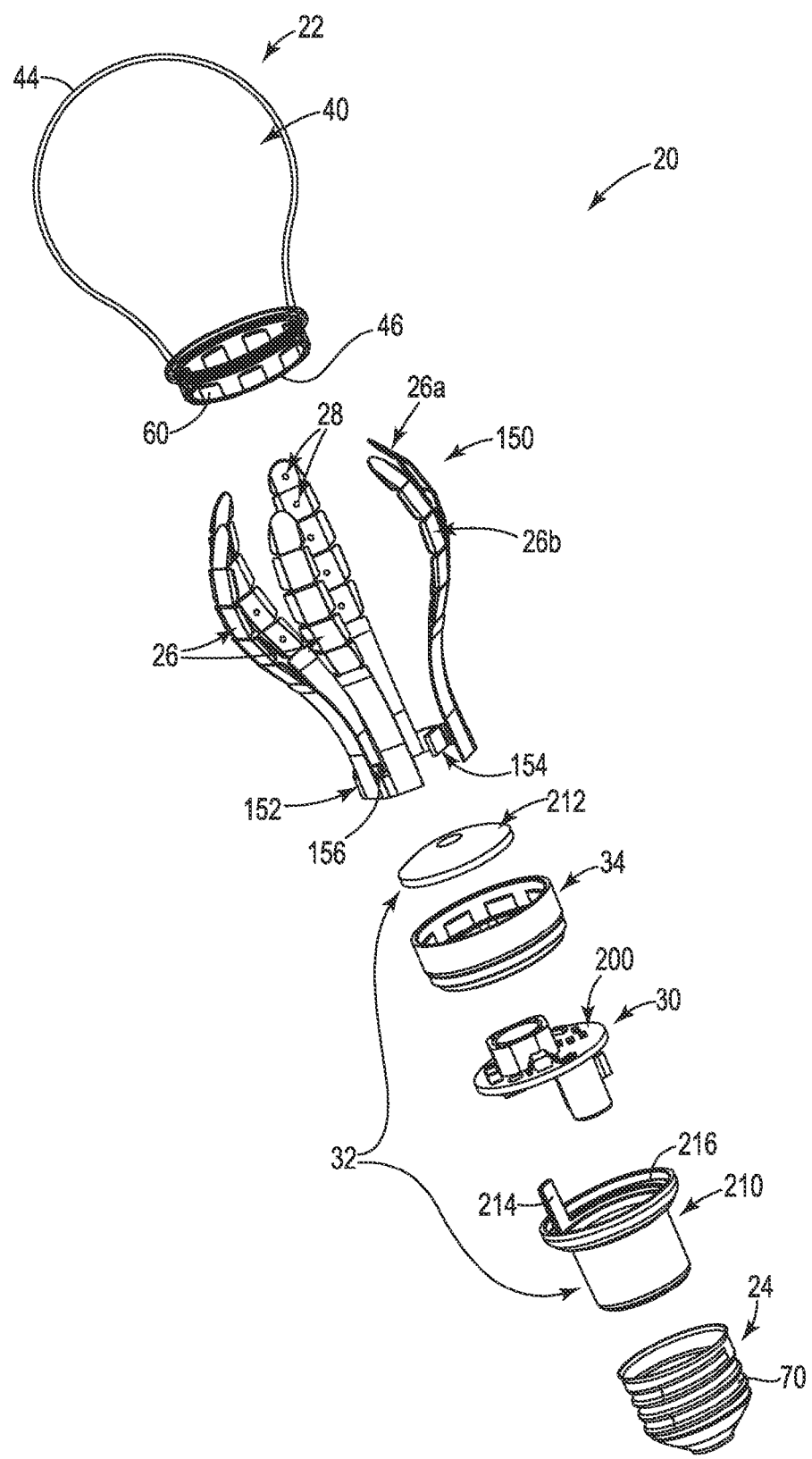
FIG. 3 is a perspective exploded view of the light bulb device of FIG. 1

The bulb body 22 can optionally incorporate features that facilitate assembly with other components of light bulb device 20. For example, FIG. 3 illustrates ridges 60 formed at the lower end 46. Assembly of the bulb body 22 to other components can be achieved in a wide variety of other fashions such that in other embodiments, the ridges 60 can assume other forms or can be omitted. In yet other embodiments, features can be formed along the interior face 48 configured to promote mounting of the flexible circuit strips 26. The bulb body 22 can include or provide one or more features that facilitate rapid assembly to other components of the device 20 as implicated by the FIGS. 1-4.

The base 24 is akin to a conventional light bulb base, and has a threaded exterior surface 70 for engaging a standard threaded AC light socket or fixture to hold and power the LED light bulb device 20 to the AC light socket or fixture as is known in the art. Along these same lines, the base 24 is optionally formed from a conductive material (e.g., metal) as is typically employed with conventional light bulbs. The bulb-to-socket connection provided by the base 24 (or other components of the power conversion circuitry assembly 30) can be of other types common in the industry. The base 24 (and other components of the power conversion circuitry assembly 30) can have various constructions for connection to an AC power socket including, but not limited to, the Edison screw base such as the E26 medium screw base.

In some constructions, the flexible circuit strips 26 are identical and can each be a flexible circuit or flex circuit as known in the art. For example, the flexible circuit strips 26 can include a flexible, non-conductive or dielectric core material with circuitry traces or paths to each of the LEDs 28 mounted or formed thereon. In some embodiments, the flexible circuit strips 26 are flexible, laminated structures including two copper (or other conductive metal) layers (in one non-limiting example, 2 ounce copper layers) and a dielectric material. For example, the flexible circuit strips 26 can be or include dielectric thermal substrates or thermal clad laminates available from DuPont under the trade designation CooLam®. As a point of reference, with the flex circuit construction, the flexible circuit strips 26 can each be flexed or deflected to a desired shape, for example a shape dictated by the bulb body 22. Thus, in the exploded view of FIG. 3 in which the flexible circuit strips 26 are shown as having a particular shape apart from the bulb body 22, it will be understood that the flexible circuit strips 26 can be flexed or deflected to the desired shape. In some embodiments, the flexible circuit strips 26 have sufficient rigidity to hold an imparted shape.

In some embodiments the flexible circuit strips 26 are adhered to the interior face 48 of the bulb body 22 as part of the manufacture of the light bulb device 20, and must be flexed or deflected in order to be inserted into the bulb body 22 and then pressed or otherwise formed to a shape of the interior face 48. Moreover, in related embodiments, the LEDs 28 are populated on to the flexible circuit strips 26 prior to assembly to the interior face 48. The flexible circuit strips 26 incorporate various features that uniquely facilitate these assembly techniques. As a point of reference, many electrically conductive and heat spreading materials used in flex circuitry have limited elastic properties, and thus are prone to crumpling or crimping when formed, bent, or deflected. This attribute can be particularly extreme or problematic when forming the material to compound curves (such as the compound curves associated with interior face 48 of the bulb body 22 as described above). Further, to efficiently fabricate the flexible circuit strips 26 as well as to populate the circuitry with requisite electrical components, it is desirable to do so with the flexible circuit strips 26 in a flat form. Following fabrication, it is desirable to keep any bending and/or forming forces to a minimum to retain the integrity of the bonding of circuit components to the flex circuit. The likelihood of crumpling and/or crimping is intensified by beginning with a flat material form and then imparting forces short of coining forces to form the flexible circuit strips 26 to the shape of the interior face 48 of the bulb body 22.

In some embodiments, the flexible circuit strips 26 are configured to address one or more of the above concerns. One of the flexible circuit strips 26 is shown in isolation in FIGS. 5A-5C. As a point of clarification, FIGS. 5A-5C reflect the flexible circuit strip 26 as having a curvature such as following formation of the flexible circuit strip 26 to a shape of the interior face 48 (FIG. 4) of the bulb body 22 (FIG. 3); it will be understood, however, that the flexible circuit strip 26 can be forced or deflected to other shapes, including a flattened shape (for example, prior to assembly to the bulb body 22). With this in mind, the flexible circuit strip 26 generally defines opposing, front and rear surfaces 80, 82. The front surface 80 is configured for mounting of the LEDs 28 (FIG. 3), whereas the rear surface 82 is configured for attachment to the bulb body interior face 48.

With these conventions in mind, the flexible circuit strip 26 is elongated, extending between a trailing end 84 and a leading end 86, and defining opposing, first and second side edges 90, 92. In some embodiments, a perimeter shape of the flexible circuit strip 26 can exhibit a slightly increasing width from the trailing end 84 toward the leading end 86 to a location approximately mid-way along a length of the flexible circuit strip 26, and a slightly decreasing width from the location approximately mid-way along the length to the leading end 86.

Figure 5A:
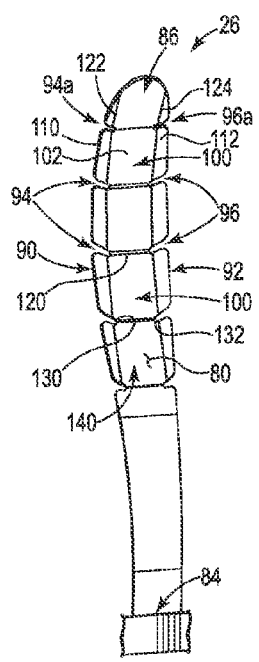
FIG. 5A is a front perspective plan view of a flexible circuit strip useful with the light bulb device of FIG. 1.
Figure 5B:
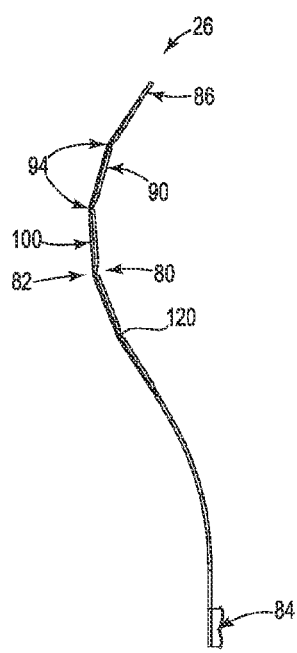
FIG. 5B is a side view of the flexible circuit strip of FIG. 5A.
Figure 5C:
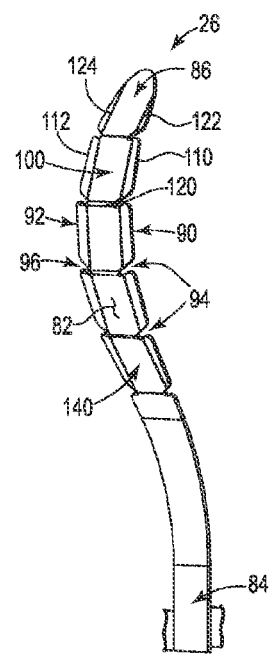
FIG. 5C is a rear perspective view of the flexible circuit strip of FIG. 5A.

One or more notches 94 are formed along or in the first side edge 90, and a corresponding one or more notches 96 are formed along or in the second side edge 92. Corresponding ones of the notches 94, 96 are laterally aligned (e.g., FIG. 5A identifies laterally aligned notches 94a, 96a) and serve to demarcate the flexible circuit strip 26 into two or more sections 100. Each section 100 is generally sized and shaped to receive at least one of the LEDs 28 at a pad region 102 (e.g., in some embodiments, a single one of the LEDs 28 is carried by a corresponding, single one of the pad regions 102), with the notches 94, 96 between immediately adjacent ones of the sections 100 serving to relieve stress in the flexible circuit strip 26 as the flexible circuit strip 26 is formed to a particular shape (such as when applying or forming the flexible circuit strip 26 to the compound shape and curvature of the bulb body interior face 48 (FIG. 4)). Further, the vertical spacing between axially adjacent ones of the notches 94 in the first side edge 90, and between axially adjacent ones of the notches 96 in the second side edge 92 establish tabs 110, 112 at opposite sides of the corresponding pad region 102. The tabs 110, 112 are readily formable or deflectable relative to the corresponding pad region 102, permitting closer conforming of the flexible circuit strip 26 to the curvatures of the bulb body interior face 48. FIGS. 5A and 5C reflect that in some embodiments, a horizontal fold line 120 is optionally formed in the flexible circuit strip 26 between each of the immediately adjacent ones of the sections 100 (e.g., the horizontal fold line 120 extends between or intersects the corresponding pair of aligned notches 94, 96). The horizontal fold line 120 promotes flexing or deflection of the immediately adjacent sections 100 relative to one another. Further, FIGS. 5A and 5C reflect that in some embodiments, first and second vertical fold lines 122, 124 are optionally formed in the flexible circuit strip 26 between the tabs 110, 112, respectively, and the corresponding pad region 102 at each of the sections 100. The vertical fold lines 122, 124 promote flexing or deflection of the tabs 110, 112, respectively, relative to the pad region 102. The fold lines 120-124 can be formed in various fashions as are known in the art. Alternatively, one or all of the fold lines 120-124 need not be overtly formed in the flexible circuit strip 26, with flexible circuit strip 26 naturally assuming the flexed shape as shown when forced or pressed against a shape-defining surface. In more general terms, while the sections 100 identified above may be akin to facets that are foldable relative to one another, this facet-like construction is in no way a required feature of the present disclosure. Rather, some aspects of the present disclosure are more broadly directed toward features that promote forming of the flexible circuit strip 26 to the shape and contour of the bulb body interior face 48 while minimizing stretch requirements.

The notches 94, 96 can assume a wide variety of forms. In some embodiments, the notches 94, 96 are each formed as cuts or punch-outs through a thickness of the flexible circuit strip 26, projecting or extending inwardly (from the corresponding side edge 90, 92 toward an axial centerline of the elongated shape of the flexible circuit strip 26). In other embodiments, one or more of the notches 94, 96 (and/or notches in addition to the notches 94, 96) can be formed entirely internal to a width of the flexible substrate strip 26 (i.e., a notch through a portion or an entirety of a thickness of the flexible circuit strip 26, but not extending or open to either of the opposing side edges 90, 92). The notches 94, 96 can extend generally perpendicular to a plane of the corresponding side edge 90, 92, or can extend at a non-perpendicular angle, one example of which is shown in FIGS. 5A and 5C (e.g., one or more of the notches 94, 96 can extend inwardly from the corresponding side edge 90, 92 and generally in a direction of the trailing end 84). Each of the notches 94, 96 terminates at an interior end 130, 132, respectively. The interior end 130, 132 is the end or portion of the notch 94, 96 closest to the axial centerline of the flexible circuit strip 26, and can be rounded as shown. Regardless, the interior ends 130, 132 of a corresponding aligned pair of the notches 94, 96 are spaced from one another (at opposite sides of the axial centerline) to leave sufficient surface area along the flexible circuit strip 26 for circuitry (not shown) to extend to and between each of the pad regions 102 (and thus to the LED 28 (FIG. 3) mounted thereto). Similarly, a vertical spacing between adjacent ones of the notches 94, 96 (and thus a vertical dimension of each of the pad regions 102) provides sufficient surface area for the mounting of at least one of the LEDs 28. With this construction, the pad regions 102 collectively define a vertical center zone 140 (referenced generally) along which the circuitry and LEDs are located.

In some embodiments, the notches 94, 96 can have a highly similar, optionally identical, shape and format, with the interior ends 130 of the first notches 94 being axially or vertically aligned, and the interior ends 132 of the second notches 96 being axially or vertically aligned in some embodiments (it being noted that a size or length of particular ones of the notches 94, 96 will vary as a function of the width of the flexible circuit strip 26 at the location where the particular notch 94, 96 is formed). The notches 94, 96 can assume a variety of other shapes or configurations, and can be formed in various manners. For example, one or more of the notches 94, 96 can be slits, slots, cuts, holes, perforations, gaps, serrations, inward mini-crimps, or any another stress-relieving format. In yet other embodiments, one or more of the notches 94, 96 can be characterized as a variation or variable width of the flexible circuit strip 26 (e.g., the notches 94, 96 need not be discernable "cuts" in the material of the flexible circuit strip 26 in some embodiments, but instead reflect a variable shape or width in which the flexible circuit strip 26 is "narrower" between LED pads). Regardless of form and regardless of whether the notches 94, 96 extend to the corresponding side edge 90, 92 or are entirely internal to a width of the flexible circuit strip 26, the location, shape and spacing of the notches 94, 96 can be selected to match the specific materials used for the flexible circuit strip 26. Both the thickness and the elastic properties of those materials can dictate a minimum spacing and format of the notches 94, 96 appropriate for accommodating or matching the contours of the bulb body interior face 48 (FIG. 4). The spacing of the notches 94, 96 and of the tabs 110, 112 are desirably created at pre-determined distances to permit thermal adhesive to fill the reduced but remaining space variations to the bulb body interior face 48 as described below. The tabs 110, 112 can be bent/folded to conform to the bulb body interior face 48 and to approximate the horizontal curve of the bulb body 22. The tabs 110, 112 also support folding or bending along the vertical center zone 140 in following vertical curves of the bulb body interior face 48. The stress-reducing notches 94, 96 minimize the likelihood of adhesive failure when the flexible circuit strip 26 is adhered to the bulb body interior face 48 as described below.

In addition to facilitating closely forming the flexible circuit strip 26 to the contours of the bulb body interior face 48 (FIG. 4) by relieving forming stresses, the notches 94, 96 can optionally be configured to generate an artistic or decorative effect. As described below, in some embodiments, the flexible circuit strip 26 may be visually perceptible from an exterior of the bulb body 22 (e.g., when the LEDs 28 (FIG. 3) are powered, when the LEDs 28 are not powered, or both). With this in mind, one or more of the notches 94, 96 (or one more cuts or notches in addition to the notches 94, 96) can be formatted to have an artistic or other aesthetically pleasing effect, form letters or pictorial shapes, etc. when viewed. In related alternative embodiments, indicia (e.g. pictures, words, fanciful illustrations, advertisements, etc.) can be applied or otherwise displayed on the rear surface 82 so as to be visually perceptible through the bulb body 22.

Returning to FIG. 3, in some embodiments two or more of the flexible circuit strips 26 can be integrally formed. For example, all of the flexible circuit strips 26 can be homogenously formed as part of a singular circuit strip assembly 150. The assembly 150 can be formed from a single, homogenous flex circuit structure or laminate, with the flexible circuit strips 26 interconnected at, and extending from, a base 152. Connector pads 154, 156 optionally project from the base 152, and are arranged to establish electrical connection with corresponding components of the power conversion circuitry assembly 30, delivering power to the circuitry trace(s) along each the flexible circuit strips 26.

In some embodiments, the circuit strip assembly 150 laterally spaces the flexible circuit strips 26 from one another in a manner that effectively groups the flexible circuit strips 26 into pairs. For example, FIG. 3 identifies a first grouped pair of flexible circuit strips at 26a, 26b. The two flexible circuit strips 26a, 26b are laterally spaced from one another by a lateral gap 160 (identified in FIG. 7A), a size of which is selected to permit necessary deflection or bending of the flexible circuit strips 26a, 26b when applied to the bulb body interior face 48 (FIG. 4) while arranging the LEDs 28 carried thereby at appropriate locations for centric light output.

In related embodiments, the single, continuous structure of the circuit strip assembly 150 (e.g., including the dielectric core material and circuitry traces) forms all of the flexible circuit strips 26 as well as other circuit trace surface area (e.g., tabs) at which the requisite power conversion components are integrated (including, for example, smart bulb circuit components). Further, the structure can form portions for hot and neutral connections, therefore providing a simplified method for maintaining powered LEDs along a path conforming to the shape of the bulb body 22. Once again, the structure can be a "standard" two ply circuit; one part for circuitry traces and a second part for thermal conductivity. The layers are separated and can be used for the power conversion components as described below. While the flexible circuit strips 26 have been described as being integrally formed, in other embodiments, some or all of the flexible circuit strips 26 are formed independent or discrete from one another.

With reference to FIGS. 1-4, the LEDs 28 can assume a variety of forms known in the art and conventionally employed for inorganic light-emitting diodes. The LEDs 28 can alternatively be organic light-emitting diodes (OLEDs). The selected format of the LEDs 28 may or may not produce white light, and can have various color temperatures (e.g., the LEDs 28 can be high temperature (on the order of 6500 Kelvin) products). Further, the packaging associated with the LEDs 28 may or may not incorporate color or Kelvin-modifying materials such as phosphor, quantum dots, nanocrystals, nano-fiber, and/or other coatings or layers for enhancing the light emitted by the LEDs 28. The LEDs 28 can be formed or assembled to the corresponding flexible circuit strip 26 in various fashions, including standard packaging, die-on-flex packaging, chip-on-board, wafer-layering with sputter coating that permits, for example, non-sapphire based LEDs, etc. The LEDs 28 can be mounted in ceramic packages or other package formats mounted as known-good-die (KGD) as otherwise described above but mounted directly as die to the flexible circuit strip 26 using variously known methods. It has surprisingly been found that in some embodiments, use of chip-on-board or known-good-die placed directly on the flexible circuit strips of the present disclosure can provide benefits over packaged LEDs. The smaller footprint for flatness is reduced and is thus conducive to the flexible circuit strip 26 being formed to more closely follow the curvature and contours of the bulb body interior face 48.

The power conversion circuitry assembly 30 (shown only in FIG. 3) can assume a wide variety of forms appropriate for converting AC energy (e.g., 120 volts) to DC energy appropriate for energizing the LEDs 28; or where the LEDs 28 are configured to operate based on an AC power input, the power conversion circuitry assembly 30 can incorporate components configured to convert or transform a provided AC power supply to an AC power format appropriate for powering the LEDs 28. For example, the power conversion circuitry assembly 30 can include one or more high operating temperature power transforming or converting components (e.g., MOSFET and inductors) as well as other circuitry components such as power filtering components carried by at least one board 200. The board(s) 200 can be a rigid, flexible, or a mix of rigid and flexible printed circuitry substrate or board having or forming various circuitry traces.

The isolation assembly 32, where provided, includes an insulator sleeve 210 and an optional floor 212. The insulator sleeve 210 is configured for partitioning the bulb base 24 and the optional heat sink ring 34 from circuitry components of the power circuitry assembly 30. Alternatively, the insulator sleeve 210 can be replaced with an electrically insulative material coating. In some embodiments, the insulator sleeve 210 incorporates features for mated assembly with the circuit strip assembly 150, such as slat 214. Further, the insulator sleeve 210 can include or form a groove 216 for mounting of the optional heat sink ring 34 as described below.

In some embodiments, a thermal potting compound is employed at or within the base 24 (or thermal cavity) for thermal conductivity and improved safety/distances for high pot testing. With this in mind, the floor 212, where provided, provides a stop for the potting compound at the base 24, effectively "filling" the neck region 52 of the bulb body 22 to constrain the potting material. The floor 212 can be sealed to the bulb body 22 in various manners, and optionally is configured to maximize reflection and light reflections of the LED light bulb device 20. For example, the floor 212 can be a flexible membrane-type material, such as a die-cut piece of white silicone elastomer. Alternatively, the floor 212 can be a molded liquid silicone rubber part. In other embodiments, the floor 212 can be omitted.

The optional heat sink ring 34 is separate from the flexible circuit strips 26 and is made of an appropriate heat sink material (e.g., metal, molded plastic, ceramic, etc.). In some embodiments, the optional heat sink ring 34 is ring shaped for assembly to the bulb body 22. Alternatively, the optional heat sink ring 34 can have a variety of different constructions that include one or more structures in addition to the ring.

The present disclosure is in no way limited to the power conversion circuitry assembly 30, the isolation assembly 32 and the optional heat sink ring 34 as described and shown. Any configuration capable of providing power from a standard electrical socket to the flexible circuit strips 26 in a format appropriate for powering the LEDs 28 and electrically isolated from an exterior of the bulb body 22 is acceptable.

FIG. 4 illustrates the LED light bulb device 20 upon final assembly (with the power conversion circuitry 30 (FIG. 3) omitted from the view for ease of illustration). In general terms, each of the flexible circuit strips 26 is mounted directly on to the interior face 48 of the bulb body wall 40, with the flexible circuit strips 26 each forced to a form that closely follows the shape and contour defined by the interior face 48. For example, the flexible circuit strips 26 can be formed or flexed or deflected when pressed against the interior face 48 to follow or accommodate the natural curvatures presented along the neck, first bulbous and/or second bulbous regions 52-56. The tabs 110, 112 associated with each section 100 can be deflected or bent or formed to better ensure a more conforming fit. The notches 94, 96 relieve stress in the flexible circuit strip 26 when pressed or formed to the shape of the interior face 48, such that the flexible circuit strip 26 exhibits minimal or no crimping upon final assembly. The flexible circuit strips 26 can be adhered to the interior face 48 by an adhesive, such as a pressure sensitive adhesive. Spacing, if any, between the flexible circuit strip 26 and the interior face 48 is filled with the adhesive. The adhesive can be coated or applied on to the rear surface 82 (FIG. 5B) of each of the flexible circuit strips 26 prior to placement against the interior face 48. The adhesive is thermally conductive.

The LEDs 28 associated with each of the flexible circuit strips 26 are located within the interior region 42 (i.e., are "inside" of the bulb body wall 40) and thus are protected by the bulb body 22. Further, the LEDs 28 are arranged to be inwardly "aiming", or otherwise facing in a general direction of an axial or longitudinal centerline defined by the shape of the bulb body 22. As shown, the flexible circuit strips 26 extend longitudinally along the interior face 48 from a location at or adjacent the open lower end 46 in a direction of the top end 44. Relative to an exposed length of the bulb body 22 (i.e., distance between the optional heat sink ring 34 and the top end 44), the flexible circuit strips 26 can each extend approximately ⅔ the exposed length, although other distances (either greater or lesser) are also acceptable. In this regard, one or more of the LEDs 28 provided along each of the flexible circuit strips 26 can be arranged at a desired angle relative to a shape of the bulb body wall 40 at which the LED 28 is ultimately positioned to provide optimal illumination from the LED light bulb device 20. For example, the "top-most" LED carried by one or more of the flexible circuit strips 26 is naturally arranged to "aim" downwardly (due to the flexible circuit strip 26 following the natural contour or shape of the bulb body 22), projecting light out toward the base or neck region 52. Conversely, one or more "lower" LEDs carried by one or more of the flexible circuit strips 26 is naturally arranged to "aim" upwardly (again, due to the flexible circuit strip 26 following the natural contour or shape of the bulb body 22), projecting light out toward the closed top end 44.

Assembly of the remaining components of the LED light bulb device 20 can assume a variety of forms. With the exemplary embodiment of FIG. 4, the insulator sleeve 210 is mounted within the base 24. The power conversion circuitry assembly 30 (not shown in FIG. 4) is connected to the insulator sleeve 210. The flexible circuit strips 26 are electrically connected to corresponding components of the power conversion circuitry assembly 30. The optional heat sink ring 34 is mounted to the insulator sleeve 210, and the bulb body 22 is mounted to the optional heat sink ring 34. Finally, the floor 212 is secured over the power conversion circuitry assembly 30.

Upon final assembly, the optional heat sink ring 34 is generally aligned with or surrounds components of the power conversion circuitry assembly 30, serving to transfer heat in an electrically isolated manner. While a portion of the each of the flexible circuit strips 26 is also located proximate the optional heat sink ring 34 (i.e., that portion making electrical contact with the power conversion circuitry assembly 30), LED light bulb devices of the present disclosure are, in some embodiments, characterized by the absence of a separate metal heat sink body in close proximity to substantial portions of the flexible circuit strips 26, and in particular immediately adjacent the LEDs 28. Instead, it has surprisingly been found that sufficient heat transfer is accomplished by placing or abutting the circuit strip 26 directly against the bulb body wall 40. Heat generated by operation of the LEDs 28 sufficiently transfers to the ambient environment through the corresponding flexible circuit strip 26, the thermally conductive adhesive, and the bulb body wall 40, as well as along the flexible circuit strip 26 and to the optional heat sink ring 34. Optionally, small metal heat sink bodies (e.g., heat sink buttons) can be assembled to the bulb body 22 immediately opposite a corresponding one the flexible circuit strips 26, and in particular directly opposite a corresponding one of the LEDs 28 carried thereby; the heat sink button projects through a thickness of the bulb body wall 40 and is in thermal contact with the flexible circuit strip 26 to more directly conduct heat to ambient. In other optional embodiments, a flexible linear fin or wire can be assembled to the flexible circuit strip 26 in manner that permits desired deflection/flexing of the flexible circuit strip 26 in matching a shape of the bulb body 22 while providing an additional path for heat transfer.

During operation, the flexible circuit strips 26 deliver power to the LEDs 28 mounted thereto, causing the LEDs 28 to emit light. In this regard, the LEDs 28 can be arranged along a length of the bulb body 22 to "aim" in a desired direction to more fully illuminate the interior region 42. Notably, by optionally locating the LEDs 28 in highly close proximity to the bulb body wall 40, the generally inwardly aiming light cone generated by each LED 28 travels a significant distance before reaching (and emitting through) the bulb body 22 opposite the location of the LED 28 so as to maximize a size of the illumination cone. Thus, the light bulb devices of the present disclosure can improve the aiming of LED light (centric light output) that achieves the most perpendicular positioning of the LED to the opposing side of the bulb body 22 and maximizes the light output through the bulb body 22. Again, the flexible circuit strips 26 being most aligned to the curvature of the bulb body 22 shape or most against the interior face 48 perpendiculary supports this value. A light at an angle reflects or loses more internal reflectance (off the surface) and loses lumens.

Figure 6A:
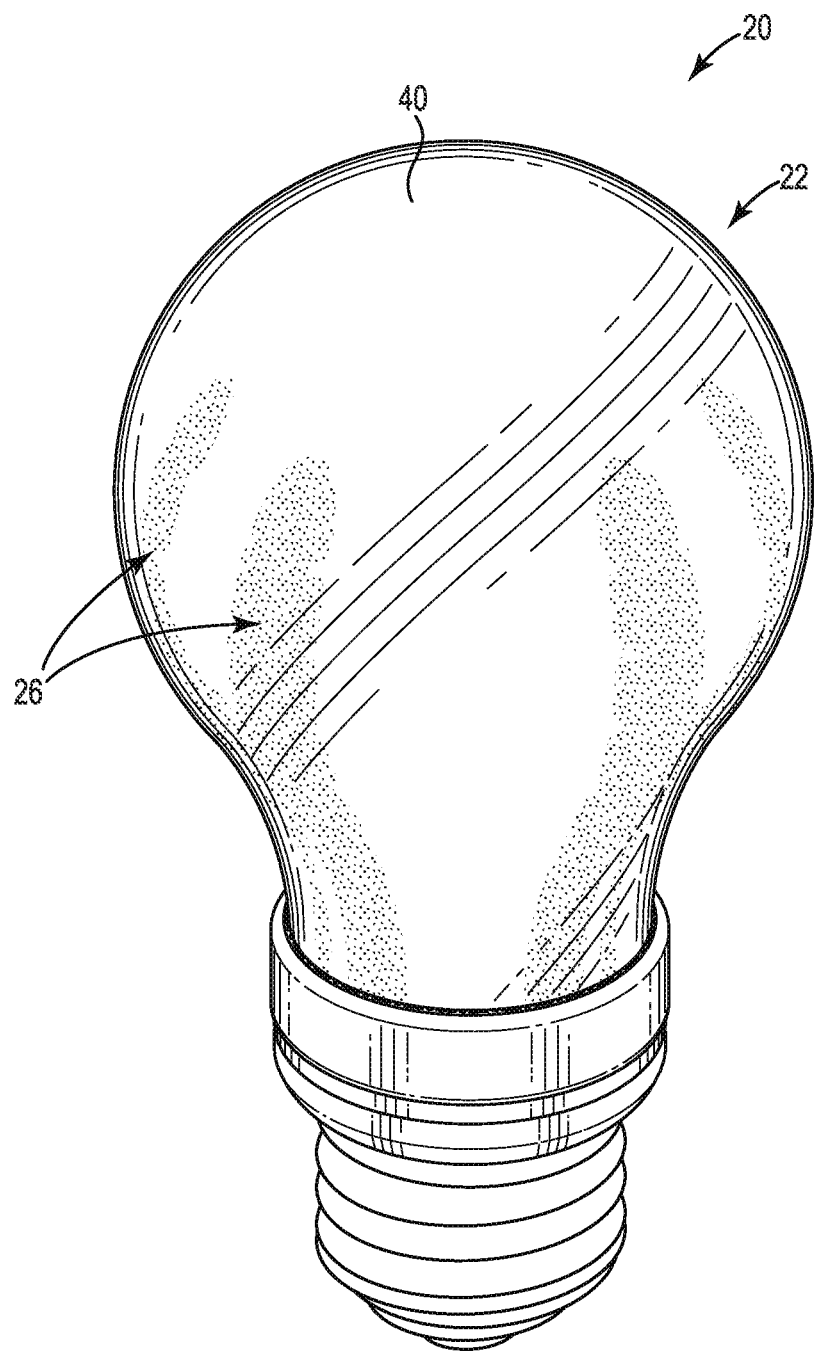
FIG. 6A is an enlarged perspective view of the light bulb device of FIG. 1 and in a powered off state.
Figure 6B:
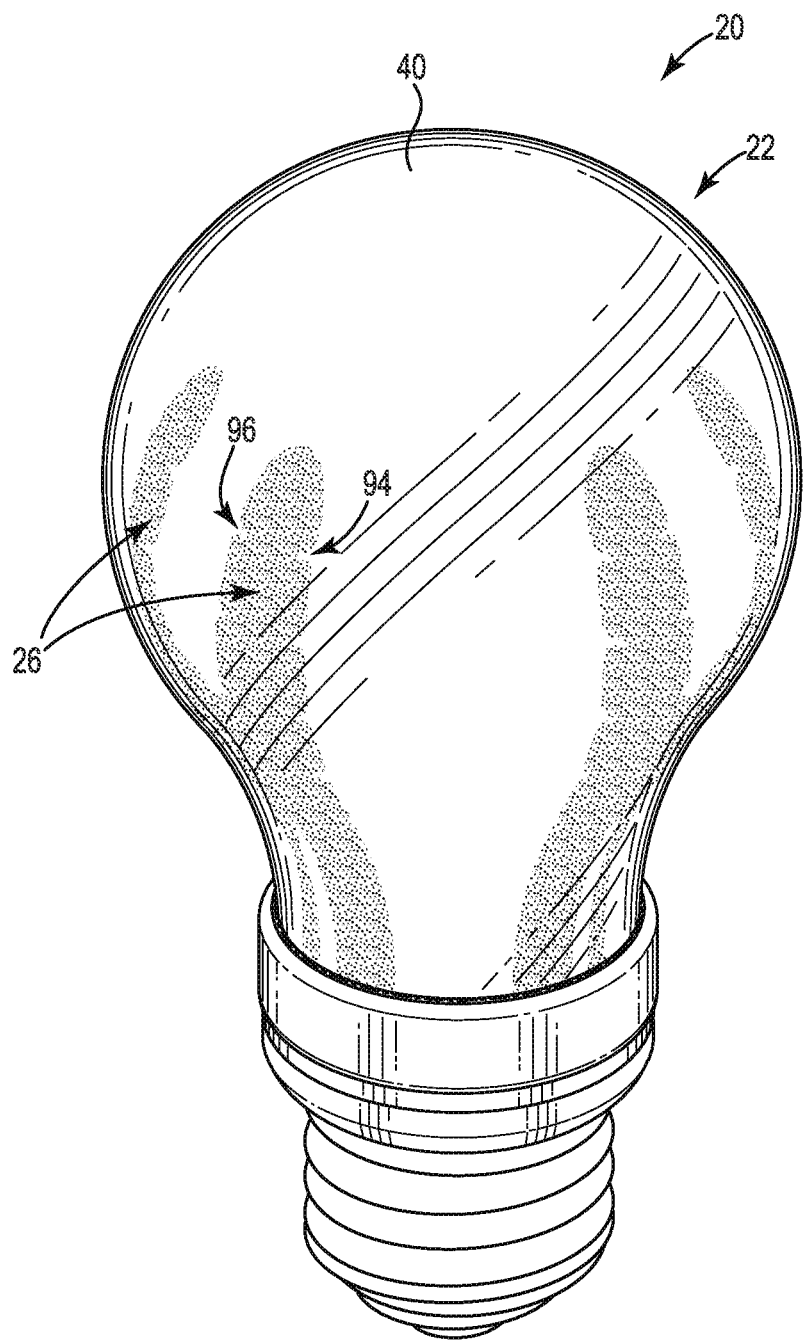
FIG. 6B is the light bulb device of FIG. 6A and in a powered on state.

With embodiments in which the bulb body 22 is not completely transparent (e.g., a "frosted" appearance), the flexible circuit strips 26 may not be readily apparent to a viewer of the LED light bulb device 20 when the LEDs 28 are not otherwise powered on. For example, FIG. 6A is one exemplary representation of the light bulb device 20 in a powered off state. When the LEDs 28 are powered and emit light, the flexible circuit strips 26 may be more visually perceptible, as reflected, for example, by FIG. 6B. As shown, a shape of the notches 94, 96 can be visually perceptible in either the powered off or powered on states, and can optionally be configured to create a decorative visual effect. Further, due to the very thin gap between the flexible circuit strips and the bulb body wall 40, indicia optionally printed on the flexible circuit strip 26 (or on the adhesive) can also be visually seen through the bulb body 22 as described below.

Figure 7A:
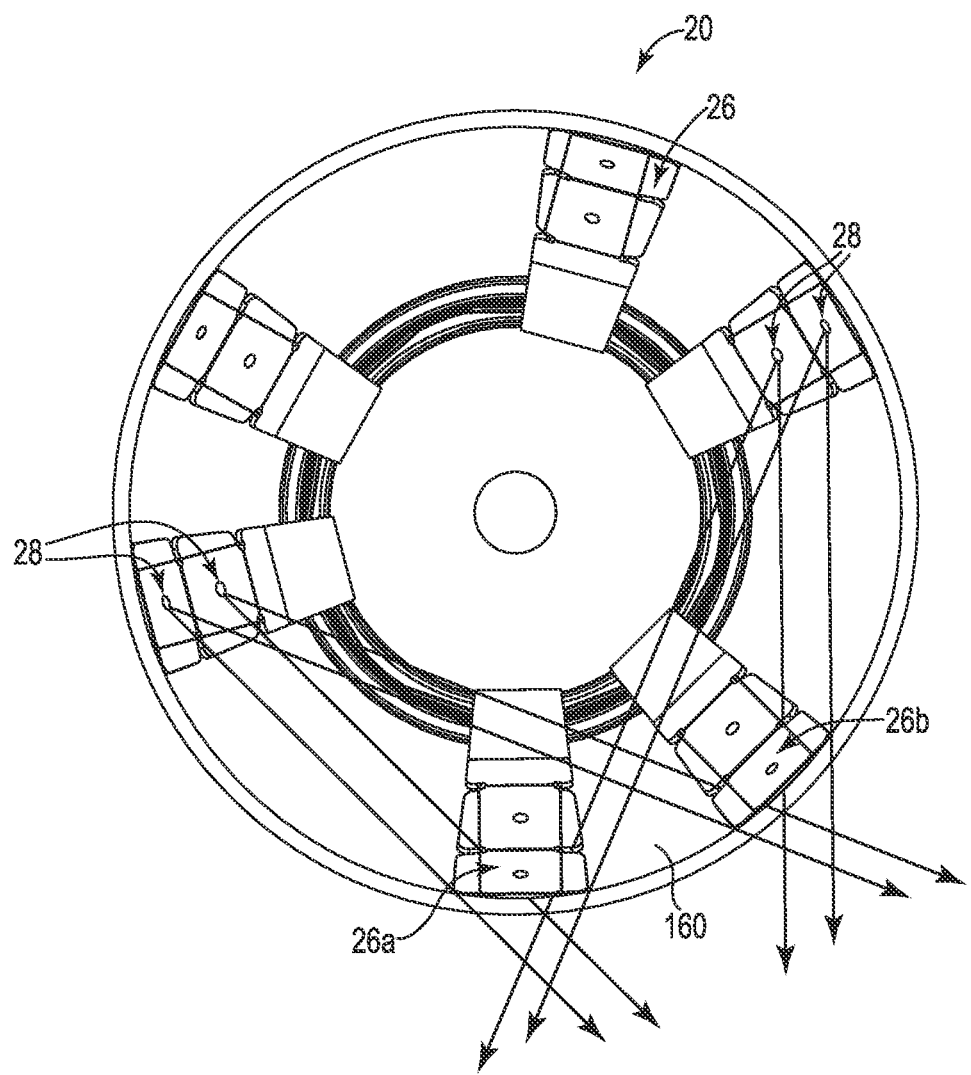
FIG. 7A is a transverse cross-sectional view of the light bulb device of FIG. 1.

Although the flexible circuit strips 26 may be more visually perceptible when the LEDs 28 are powered on, the notches 94, 96 and the spaced arrangement of the flexible circuit strips 26 overtly minimize any perceptible shadowing beyond a short distance from the bulb body 22. For example, FIG. 7A is a transverse cross-sectional view of the LED light bulb device 20. With some embodiments of the present disclosure and as described above, the flexible circuit strips 26 are provided in pairs via the circuit strip assembly 150. The flexible circuit strips 26 each have a relatively small width, and the flexible circuit strips 26a, 26b within each pair are separated by the gap 160a. As a result, light rays (drawn generally in FIG. 7A) from the LEDs 28 associated with other flexible circuit strips 26 opposite or away from the gap 160a exit the bulb body 22 at various angles relative to edges of the flexible circuit strips 26a, 26b as well as "through" the notches 94, 96, thereby minimizing the distance from the bulb body 22 at which a shadow will exist. By providing the pairs of circuit strips 26a, 26b, the LEDs 28 can be optimally located for light distribution and heat transfer. The short shadow created by the circumferentially spaced apart flexible circuit strips of the present disclosure promotes implementations with other bulb shapes; a relatively tight globe or shade shape can be employed without casting a noticeable shadow.

With the embodiments of FIGS. 1-4, as well as with the other LED light bulb devices of the present disclosure as described below, the nature of the flexible circuit strips 26 as they are adhered along the curvature of the interior face 48 of the bulb body 22 provides a maximized distance from the light-emitting face of the corresponding LEDs 28 to the exiting of light from the LED light bulb device 20 as emitted light rays cross a centerline or central axis of a shape of the bulb body 22. In some embodiments, the LEDs 28 each emit or generate a cone-shaped pattern of light that is brightest at the center of the projection and lessening to all sides. As a plurality of the LEDs 28 are positioned along multiple ones of the discretely applied flexible circuit strips 26, lumen projections from the collection of LEDs 28 overlap. An ideal spacing between LEDs 28 can be established based on overlap calculations, graphical refinement or through testing. Thus, with embodiments of the present disclosure, a substantially uniform combination of light patterns can be achieved. Further, as the LEDs 28 associated with a particular one of the flexible circuit strips 26 are spaced apart along the length of the flexible circuit strip 26 and the flexible circuit strip 26 follows the natural shape or contour of the bulb body wall 40, an angle or direction of light as emitted from each of the LEDs 28 varies along the length of the flexible circuit strip 26 (due the flexible circuit strip 26 following the curvature of the bulb body wall 40). As the respective flexible circuit strips 26 are circumferentially spaced from one another (relative to a circumference generally defined by a shape of the bulb body wall 40, the overlapping light projections from the LEDs 28 collectively becomes spherical, exhibiting substantial uniformity in light as emitted from the LED light bulb device 20. An optimized or ideal spacing of the flexible circuit strips 26 and the LEDs 28 inside the shape (e.g., sphere-like) of the bulb body 22 creates a combination of the overlapping lumen or light pattern and angle of LED directionality that, in combination, is akin to or mimics the light projection angles and lumen uniformity found with conventional incandescent light bulbs. Because the "top most" LED or LEDs 28 associated with one or more of the individual flexible circuit strips 28 (optionally with all of the flexible circuit strips 26) are naturally "aim" generally downwardly, light rays are readily directed toward, and outward from, the base or neck region 52 in a manner not fully attained with other LED light bulb device designs.

Figure 7B:
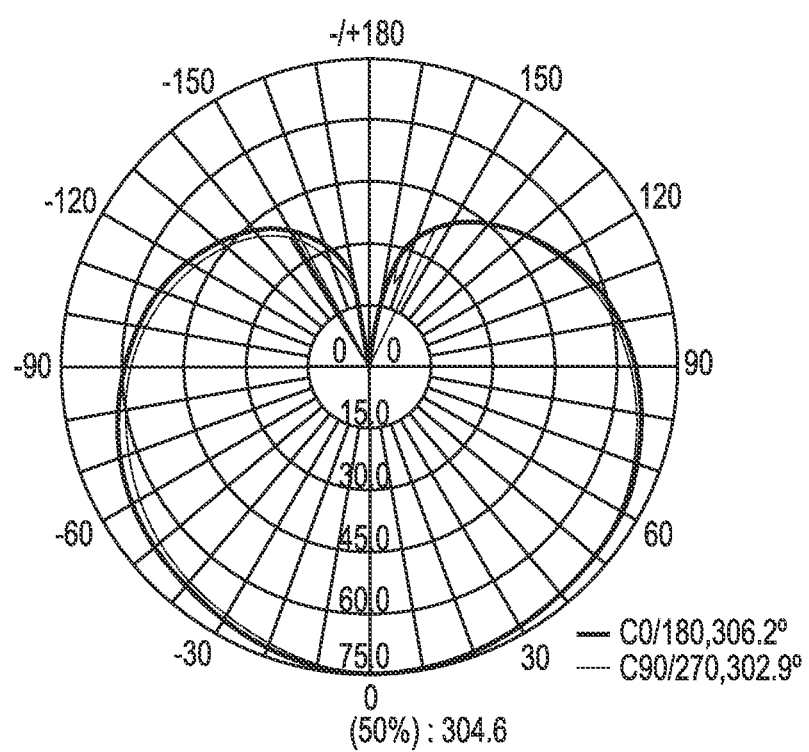
FIG. 7B is an illumination plot of an example LED light bulb device in accordance with principles of the present disclosure.

For example, FIG. 7B illustrates a light distribution or diffusion testing results for an example LED light bulb device prepared in accordance with the LED light bulb device 20 of FIGS. 1-4. Pursuant to the testing standards of IES (Illuminating Engineering Society of North America) LM-79-08 (Approved Method for the Electrical and Photometric Measurements of Solid-State Lighting Products), luminous intensity was measured about the central or polar axis of the bulb body 22 shape in maximum increments of 22.5° from 0° to 180° about the polar axis. Within each vertical plane, luminous intensity measurements are taken from 0° to 135° at 5° vertical angle increments. At least 90%, and in some embodiments at least 96%, of the luminous intensity measured values (candelas) varied by no more than 25% from the average of all measured values. It was further found that at least 90% of the luminous intensity measured values varied by no more than 19% in some embodiments. Further, all measured values (candelas) varied by no more than 50% from the average of all measured values. At least 5% of the total flux (zonal lumens) was emitted in the 135° to 180° zone. The illumination plot of FIG. 7B is highly akin to the expected illumination plot of an incandescent light bulb (subjected to the same testing protocols); in some embodiments, the LED light bulb devices of the present disclosure have a light distribution illumination plot within 10% of the illumination plot associated with a standard incandescent light bulb.

Returning to FIGS. 1-4, the optimized location of the LEDs 28 and corresponding angles of the present disclosure, once determined, also spread out the distances between the LEDs 28 along a surface of the bulb body 22 to create a more diverse spacing of thermal generation points (i.e., behind or the rear face of each of the LEDs 28). The heat is projected into the bulb body 22, with the spaced apart locations effectively generating larger surface areas along the bulb body 22 for heat transfer and thus more diverse hot zones. Even with embodiments in which the bulb body 22 is formed of a less-than ideal thermal transfer material (e.g., plastic), the relatively large surface area thermal transfer zones along the bulb body 22 promotes sufficient heat transfer for the LEDs 28. The LED light bulb devices of the present disclosure promote convection (or heat transfer) over the entire surface of the bulb body 22, thus improving the "wicking away" of heat in a unique fashion from the entire bulb device 20 regardless of spatial orientation. In some embodiments, a center-to-center spacing between each of the LEDs 28 provided with the LED light bulb device 20 is at least 0.5 inch.

The flexible circuit strips 26 can extend primarily in the longitudinal direction as shown. In other embodiments, one or more of the flexible circuit strips 26 can spiral along a shape of the bulb body 22 (e.g., less than one complete revolution, a single revolution or spiral, multiple revolutions or spirals, etc.). Also, while the front surface 80 of each of the flexible circuit strips 26 has been illustrated as being structured or contoured, in other embodiments the front surface 80 can be relatively smooth.

As mentioned above, the LED light bulb devices of the present disclosure are not limited to the number and/or perimeter shape of the flexible circuit strips as shown. For example, another embodiment LED light bulb device 250 akin to the devices described above is shown in FIG. 8, and includes the bulb body 22, the bulb base 24, the LEDs 28, the power conversion circuitry assembly 30 (hidden in FIG. 8), the optional isolation assembly 32 (referenced generally in FIG. 8), and the optional heat sink ring 34 as described above. In addition, the light bulb device 250 includes flexible circuit strips 252 mounted (e.g., adhered) directly to an interior face of the bulb body wall 40 as with previous descriptions. As a point of reference, the bulb body 22 is illustrated in FIG. 8 as being transparent so as to better depict the flexible circuit strips 252 and the LEDs 28.

Figure 8:
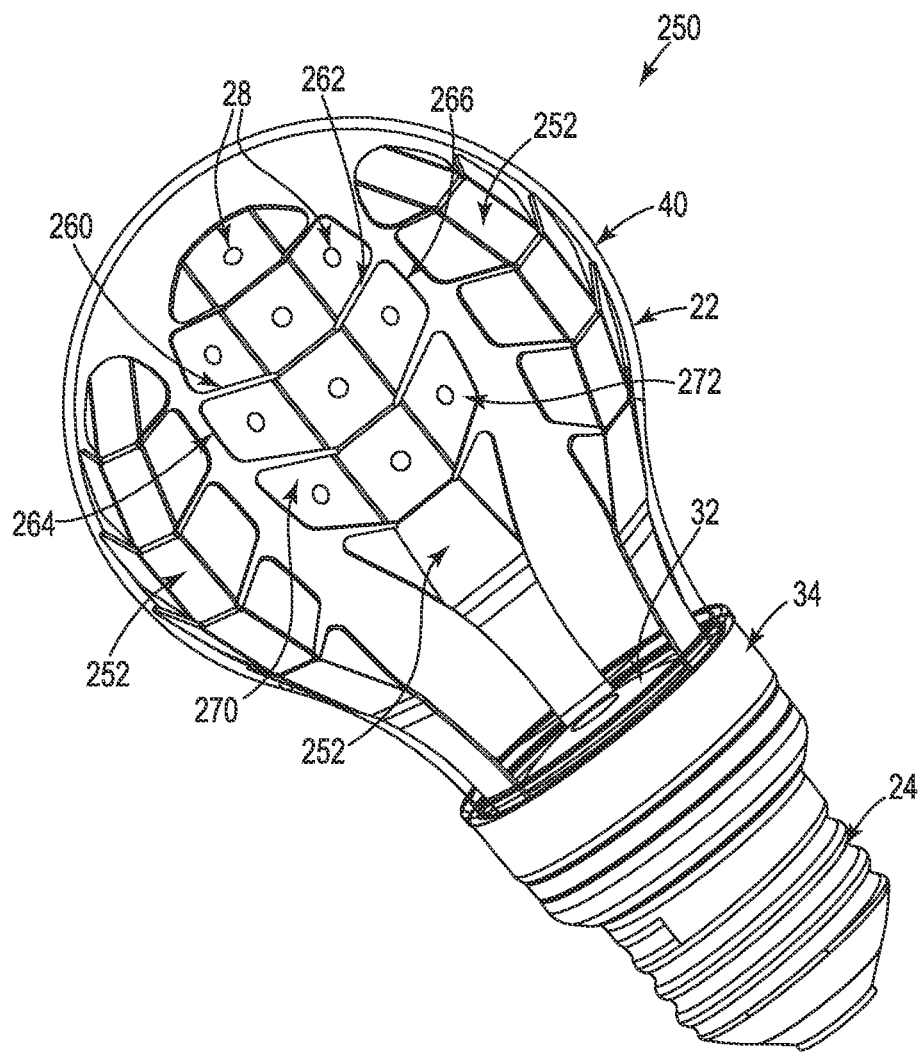
FIG. 8 is a perspective view of another LED light bulb device in accordance with principles of the present disclosure and with portions drawn transparent.

While the flexible circuit strips 252 can be similar in structure to the flexible circuit strips 26 (FIG. 3), with the embodiment of FIG. 8, the flexible circuit strips 252 can have a wider or leaf-like shape, and can carry a number of LEDs 28, including LEDs 28 arranged across a width of the flexible circuit strip 252. With the embodiment of FIG. 8, then, a lesser number of the flexible circuit strips 252 are provided (e.g., three), each carrying a greater number of the LEDs 28 (as compared to the embodiments of FIGS. 1-4). However, as with previous embodiments, each of the flexible circuit strips 252 forms or defines stress-relieving notches, for example opposing pairs of horizontally aligned notches 260, 262 extending from a corresponding side edge 264, 266, respectively. The notches 260, 262 can take any of the forms described above, and serve to facilitate a more uniform (e.g., minimal or no crimping) conformance of the flexible circuit strip 252 to the shape and contours of the bulb body interior face, for example as the flexible circuit strip 252 is pressed against the bulb body interior face and attached thereto by an adhesive. Tabs 270, 272 established by the notches 260, 262 can also be readily oriented to conform to the shape and contour of the bulb body interior face.

A number of other shapes and designs for the flexible circuit strips of the present disclosure are also envisioned, each facilitating sufficient transfer of the heat from the LEDs 28 carried thereby via direct mounting to the interior face of the bulb body 22 and in the absence of any discrete metal heat sink bodies (apart, perhaps, from the optional heat sink ring 34).

Figure 9:
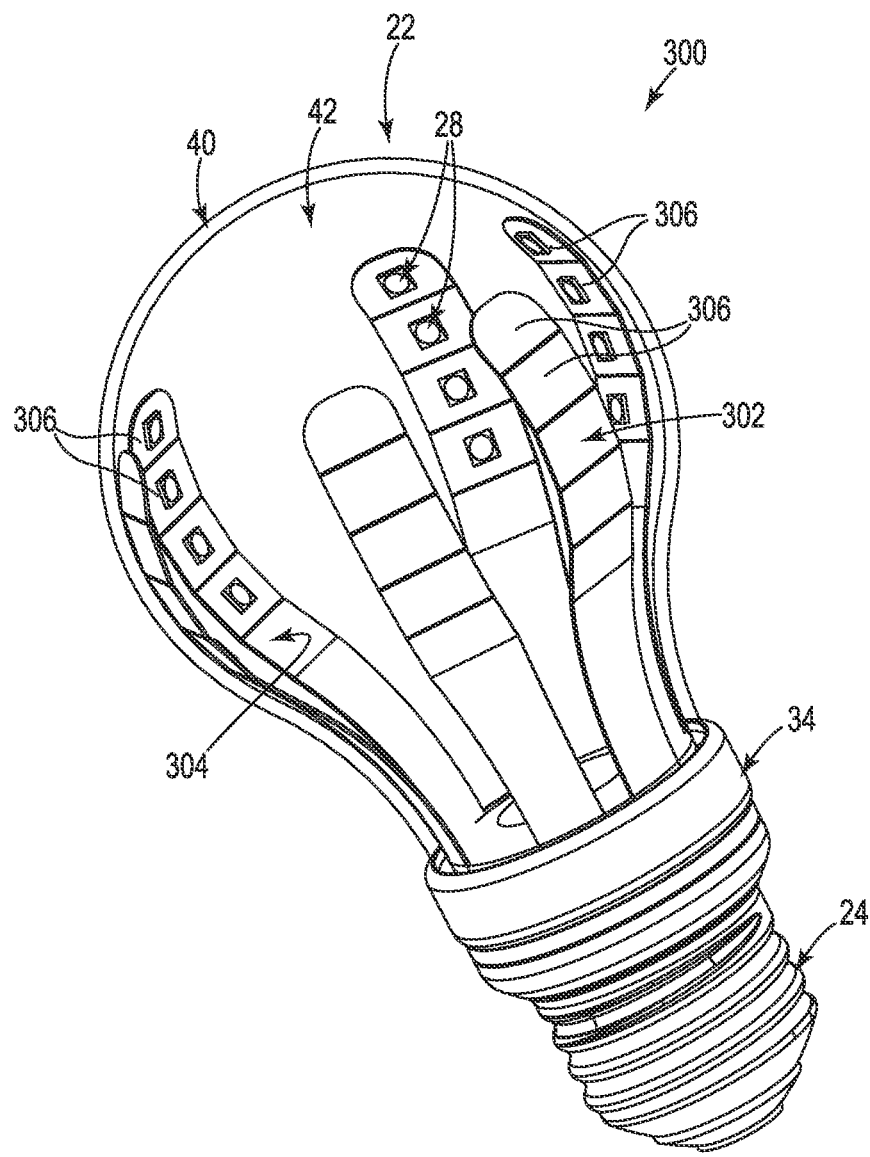
FIG. 9 is a perspective view of another LED light bulb device in accordance with principles of the present disclosure and with portions drawn transparent.

For example, FIG. 9 illustrates portions of another LED light bulb device 300 in accordance with principles of the present disclosure. The LED light bulb device 300 can be highly akin to the light bulb device 20 (FIGS. 1-4), and includes the bulb body 22, the bulb base 24, the LEDs 28, the power conversion circuitry assembly 30 (hidden in FIG. 9), the optional isolation assembly 32 (hidden in FIG. 9), and the optional heat sink ring 34 as described above. In addition, the light bulb device 300 includes flexible circuit strips 302 mounted (e.g., adhered) directly to an interior face of the bulb body wall 40 as with previous descriptions. As a point of reference, the bulb body 22 is illustrated in FIG. 9 as being transparent so as to better depict the flexible circuit strips 302 and the LEDs 28. The flexible circuit strips 302 can be highly similar to the flexible circuit strips 26 (FIG. 3) described above, having a structured front face 304, for example forming a plurality of facets 306. Respective ones of the LEDs 28 are positioned at corresponding ones of the facets 306, serving to arrange the LEDs 28 to more fully illuminate the interior region 42. While each of the flexible circuit strips 302 is shown as carrying four of the LEDs 28 (with a corresponding facet structure), other numbers, either greater or lesser, are equally acceptable. With the embodiment of FIG. 9, the flexible circuit strips 302 do not include the notches of other embodiments.

Figure 10:
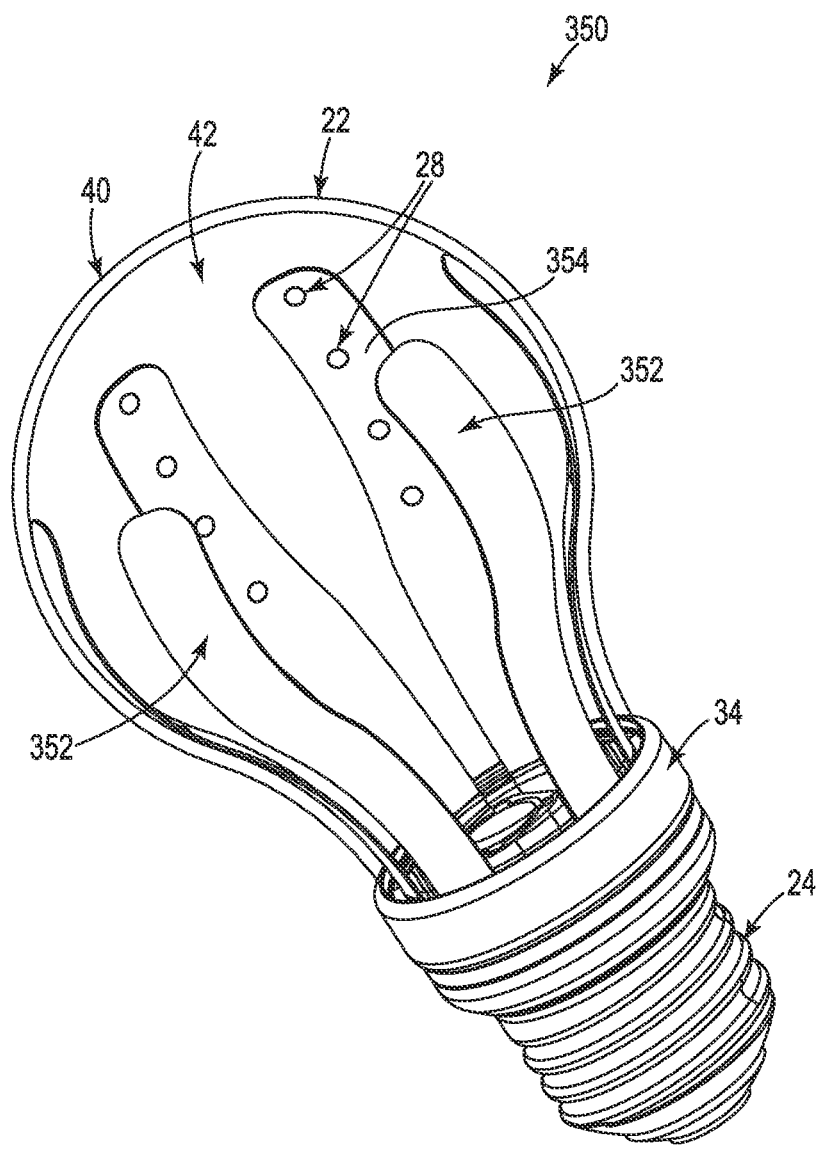
FIG. 10 is a perspective view of another LED light bulb device in accordance with principles of the present disclosure and with portions drawn transparent.

FIG. 10 illustrates portions of another LED light bulb device 350 in accordance with principles of the present disclosure. The LED light bulb device 350 can be highly akin to the light bulb device 20 (FIGS. 1-4), and includes the bulb body 22, the bulb base 24, the LEDs 28, the power conversion circuitry assembly 30 (hidden in FIG. 10), the optional isolation assembly 32 (hidden in FIG. 10), and the optional heat sink ring 34 as described above. In addition, the light bulb device 350 includes flexible circuit strips 352 mounted (e.g., adhered) directly to an interior face of the bulb body wall 40 as with previous descriptions. As a point of reference, the bulb body 22 is illustrated in FIG. 10 as being transparent so as to better depict the flexible circuit strips 352 and the LEDs 28. The flexible circuit strips 352 can be akin in many respects to the flexible circuit strips 26 (FIG. 3) described above, having a front face 354 adapted to carry and arrange the LEDs 28 for illuminating the interior region 42. While each of the flexible circuit strips 352 is shown as carrying four of the LEDs 28, other numbers, either greater or lesser, are equally acceptable. With the embodiment of FIG. 10, the flexible circuit strips 352 do not include the notches or facets of other embodiments.

Figure 11:
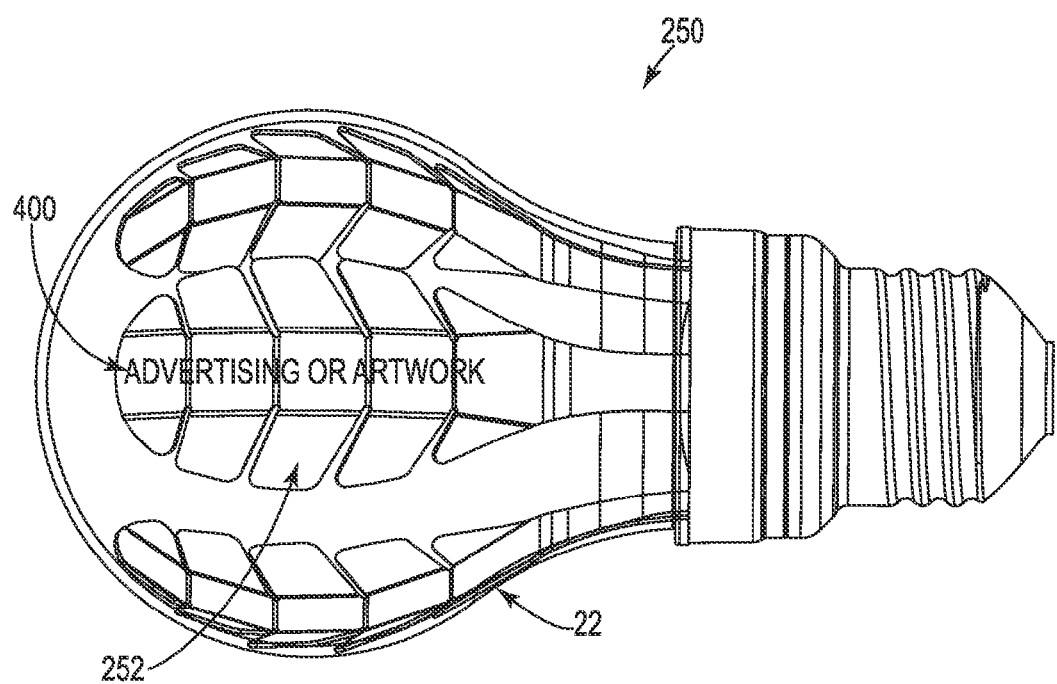
FIG. 11 is a side view of a light bulb device in accordance with principles of the present disclosure and in a powered on state.

As mentioned above, in some embodiments of the present disclosure, displayed indicia (e.g., advertising, artwork, etc.) can be incorporated into the light bulb devices of the present disclosure, visible at an exterior of the bulb body or enclosure. For example, FIG. 11 illustrates the light bulb device 250 displaying indicia 400. The indicia 400 can be formed (e.g., printed on to) the rear face of one or more of the flexible circuit strips 252, on to the adhesive bonding the flexible circuit strip 252 to the bulb body 22 (e.g., where the adhesive is opaque). Further, the indicia 400 can be configured to be more visually perceptible when the light bulb device 250 is powered on, powered off, or both. By way of one non-limiting example, the edge of the flexible circuit strip 252 can be shaped or cut to form advertising in words or images that is observed as light rays from various ones of the LEDs 28 passes "through" the cut-out (or about the edge shape) thus highlighting the message to a viewer of the light bulb device.

Figure 12A:
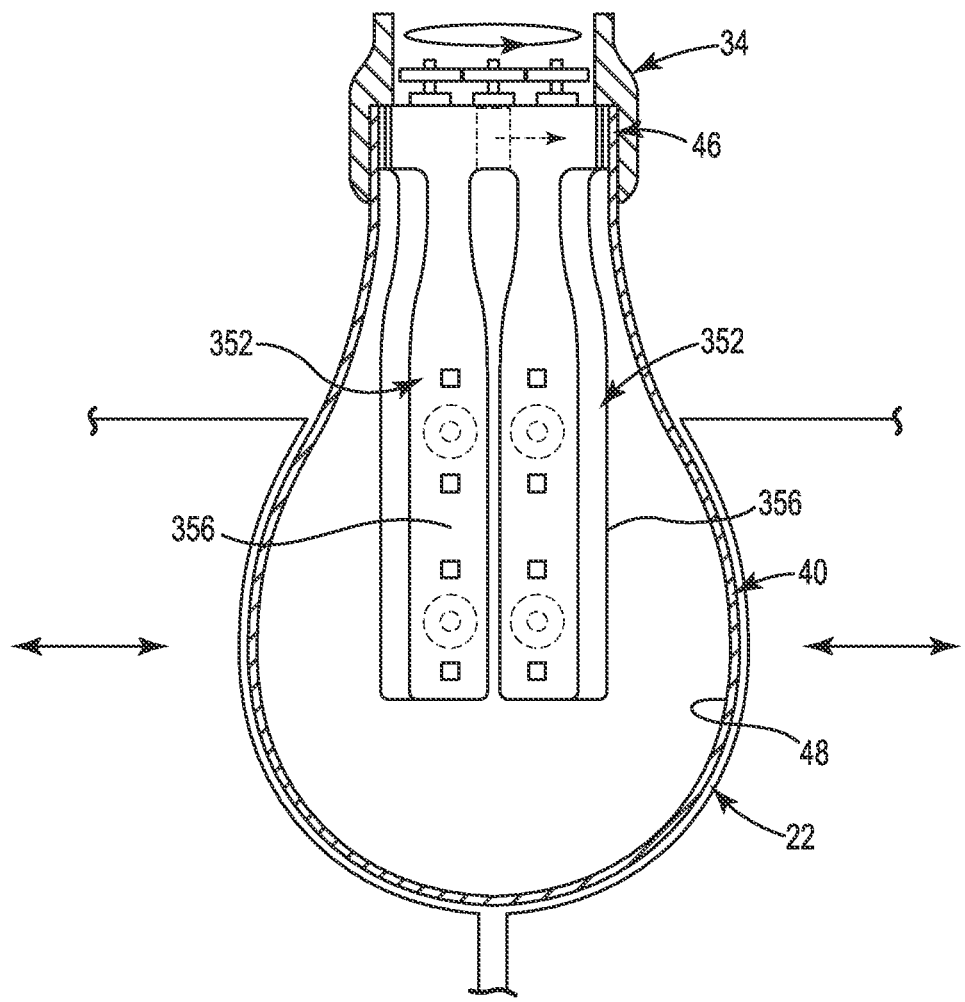
FIGS. 12A and 12B are simplified side views illustration portions of a method in accordance with principles of the present disclosure for manufacturing an LED light bulb device.
Figure 12B:
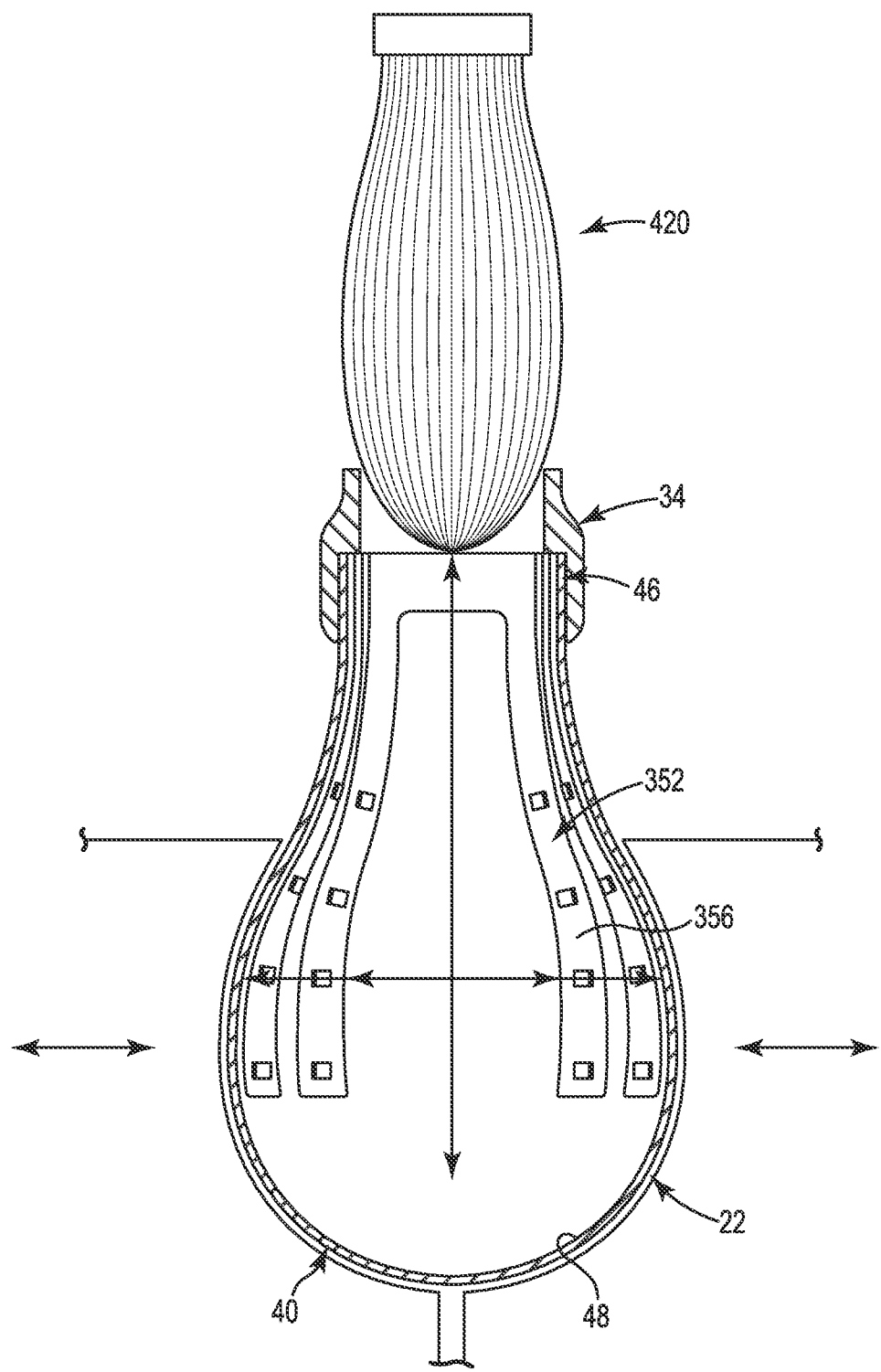

Regardless of whether the flexible circuit strips incorporate structuring (notches, facets, etc.), the LED light bulb devices of the present disclosure can be mass produced in various manners. For example, FIG. 12A illustrates an intermediate stage of manufacture in accordance with optional embodiments of the present disclosure (it will be understood that while the flexible circuit strips 352 are depicted in FIGS. 12A and 12B, the following descriptions are equally applicable to any of the flexible circuit strip embodiments of the present disclosure). The bulb body 22 has been completely formed, and the optional heat sink ring 34 has been assembled to the open lower end 46. The bulb body 22 is inverted (so that the lower end 46 is "above" the top end 44). The flexible circuit strips 352 are then inserted through the open lower end 46. In this regard, an adhesive is pre-applied or coated to a rear surface 356 of each of the circuit strips 26. Due to gravity, the flexible circuit strips 352 are readily arranged within the bulb body 22 as shown during insertion, and do not overtly adhere to the bulb body 22 with insertion. A portion of the circuit strips 352 is tacked on to the bulb body 22 immediately adjacent the lower end 46 (e.g., a trailing end 358 of each of the flexible circuit strips 352). The flexible circuit strips 352 can be simultaneously inserted and tacked via a robotic interface as generally reflected by FIG. 12A.

The circuit strips 352 are then adhered to the interior face 48 of the bulb body wall 40. For example, FIG. 12B reflects use of an expandable member, such as an inflatable balloon 420. The balloon 420 can assume various forms, and in some embodiments is pre-formed to assume a size and shape corresponding with that of the bulb body 22 upon inflation. In the contracted or deflated state of FIG. 12B, the balloon 420 in inserted into the bulb body 22 "between" or inside of the flexible circuit strips 352. As the balloon 420 is inflated or otherwise expanded toward an expanded state, the balloon 420 presses against the flexible circuit strips 352, forcing the adhesive-bearing rear surface 356 thereof into contact with the interior face 48 of the bulb body wall 40. The manufacturing methodology may include additional steps to effectuate complete adhesive bonding, such as a curing cycle. Regardless, the balloon 420 is subsequently deflated or otherwise transitioned back toward the contracted state and removed from the bulb body 22. The remaining components (e.g., the power conversion circuitry assembly 30, the isolation assembly 32 and the bulb base 24 (FIGS. 1-4)) are then assembled to the bulb body 22 and the flexible circuit strips 352 as described above.

Figure 13A:
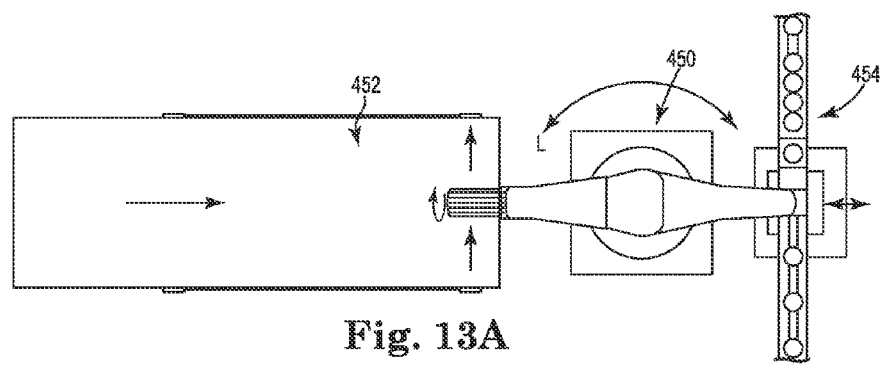
FIG. 13A is a simplified top view of an automated system in accordance with principles of the present disclosure for mass production of LED light bulb devices.
Figure 13B:
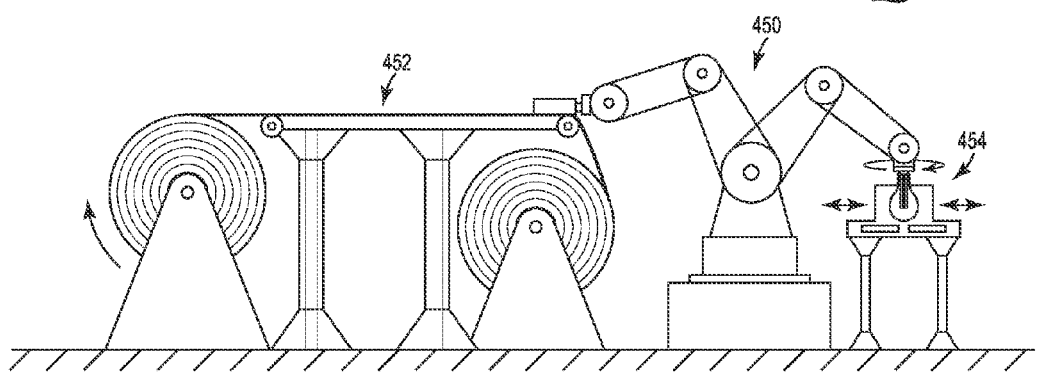
FIG. 13B is a simplified side view of the system of FIG. 13A.

FIGS. 13A and 13B illustrate a robot-based manufacturing system for mass producing the LED light bulb devices in accordance with some embodiments of the present disclosure in which flexible circuit strips carrying LEDs are fed to a robotic arm 450 by a first conveyor 452, and bulb bodies by second conveyor 454. The robotic arm 450 picks flexible circuit strips from the first conveyor 452 and places them into the selected ones of the bulb bodies at the second conveyor 454. The second conveyor 454 can be configured to rotate individual bulb bodies to achieve desired insertion and mounting as described above.

Returning to FIGS. 1-4, in yet other embodiments of the present disclosure, the flexible circuit strips 26 are formed directly on the interior face 48 of the bulb body wall 40 (e.g., the flexible circuit strips 26 are not limited to thermal substrates conventionally used for LED packaging). For example, the flexible circuit strips 26 can be formed on the interior face 48 via a spray-on additive manufacturing technique (or 3D printed electronics) available, for example, from Optomec of Albuquerque, N. Mex. After spraying or forming the flexible circuit strips 26 on to the interior face 48, the LEDs 28 are then mounted to the so-formed flexible circuit strips 26 for example via an adhesive or epoxy. These alternative designs are highly amenable to robotic mass production, with the spray nozzles being robotically inserted into the bulb body 22 as described above and then controlled to apply or create appropriate circuitry traces and pads. The spray can be controlled to create a variable thickness to match the curved shape of the bulb body 22 and to accommodate or best orient a conventionally "flat" LED 28, and/or the thickness can be varied to enhance heat transfer. Further, the LEDs 28 can be pre-packaged or shaped to accommodate the curved bulb body 22 shape and/or with appropriate pads or other connectors well-suited for electrical connection the circuitry traces generated by the flexible circuit strips 26, and can be robotically placed at precise locations that optimize light distribution.

The LED light bulb devices incorporating the flexible circuit strips (that otherwise carry the LEDs) with optional stress-relieving notches that promote uniform, direct assembly to the interior face of the bulb body wall of the present disclosure provide a marked improvement over previous designs. The flexible circuit strips can be populated with LEDs while in a relative flat form, and then readily formed or pressed to the shape of the bulb body wall, tightly following the shape and contour of the bulb body's interior face. The optional notching overcomes forming obstacles presented by the natural stiffness of the laminating of circuit, dielectric and thermal layers otherwise comprising the flexible circuit strip. Light distribution is greatly improved. A homogenous, seamless bulb body can be used, supporting use of the light bulb device in a wide range of environments or conditions (e.g., outdoors). Further, because the flexible circuit strips more uniformly conform to the shape and contours of the bulb body interior face with minimal or no crimping, heat is sufficiently transferred without requiring additional metal heat sinks directly assembled to the LEDs. The light bulb devices of the present disclosure thus require a minimal number of parts, are easily assembled, and are visually appealing, substantially replicating the shape and appearance of a common incandescent light bulb (e.g., A-19 format). The LED light bulb device formats of the present disclosure can combine LED distances, spacing, and orientation in a specific pattern that improves light diffusion and uniformity, thermal directness and maximized area in any orientation to provide a better performing and more incandescent light bulb-like light and heat distribution as compared to conventional LED light bulb device designs.

Although the present disclosure has been described with reference to preferred embodiments, workers skilled in the art will recognize that changes can be made in form and detail without departing from the spirit and scope of the present disclosure. For example, LED light bulb devices in accordance with principles of the present disclosure can incorporate additional features such as coatings, films, fabrics, surfaces texturing, etc., which desirably affect or diffuse light emanating from the LEDs.

What is claimed is:

1. An LED light bulb device comprising:
    a bulb body;
    a plurality of flexible circuit strips formed to a shape of, and adhered directly to, an interior face of the bulb body, wherein at least one of the flexible circuit strips defines a plurality of stress-relieving notches;
    at least one LED mounted to a corresponding one of the flexible circuit strips and electrically connected to a conductive trace formed by the flexible circuit strip;
    wherein the at least one LED is arranged to aim inwardly relative to the bulb body;
    and further wherein the LED light bulb device is characterized by the absence of a metal heat sink body in direct contact with any of the flexible circuit strips immediately opposite the corresponding LEDs.

2. The LED light bulb device of claim 1, wherein each of the flexible circuit strips includes thermally conductive structure defining a front surface and a rear surface, and further wherein the LED is mounted to the front surface and the rear surface is adhesively attached to the interior face of the bulb body.

3. The LED light bulb device of claim 1, wherein at least one of the flexible circuit strips defines a front surface to which the at least one LED is mounted and a rear surface opposite the front surface, the rear surface facing the interior face of the bulb body upon final assembly, and further wherein the at least one flexible circuit strip further includes indicia displayed on the rear surface.

4. The LED light bulb device of claim 1, wherein each of the flexible circuit strips has an elongated shape defining an axial centerline, and further wherein the plurality of stress-relieving notches associated with each of the flexible circuit strips includes a first pair of notches that are aligned with one another relative to the corresponding centerline.

5. The LED light bulb device of claim 4, wherein the plurality of stress-relieving notches associated with each of the flexible circuit strips further includes a second pair of notches that are aligned with one another relative to the corresponding centerline and are longitudinally spaced from the corresponding first pair of notches.

6. The LED light bulb device of claim 5, wherein a section is established between the first and second pair of notches, the section including a pad region, and further wherein at least one LED is mounted to the pad region.

7. The LED light bulb device of claim 6, wherein the section further includes opposing tabs at opposite sides of the pad region.

8. The LED light bulb device of claim 7, wherein the opposing tabs are foldable relative to the corresponding pad region.

9. The LED light bulb device of claim 6, wherein each of the flexible circuit strips defines a plurality of the sections, and further wherein each of the flexible circuit strips forms a fold line between immediately adjacent ones of the corresponding sections.

10. The LED light bulb device of claim 1, wherein at least one of the plurality of stress-relieving notches is formed entirely through a thickness of the corresponding flexible circuit strip.

11. The LED light bulb device of claim 1, wherein at least one of the plurality of stress-relieving notches is open to a side edge of the corresponding flexible circuit strip.

12. A method of making an LED light bulb device, comprising:
   providing a bulb body that defines an open end opposite a closed end;
   providing a plurality of flexible circuit strip assemblies, each of the assemblies including a flexible circuit strip, at least one LED, and an adhesive, wherein the flexible circuit strip defines opposing, front and rear surfaces, and further wherein the at least one LED is mounted to the front surface and the adhesive is coated on to the rear surface;
   inserting the flexible circuit strip assemblies into the open end of the bulb body;
   locating an expandable member, in a contracted state, between the flexible circuit strip assemblies;
   expanding the expandable member from the contracted state to an expanded state, causing the flexible circuit strips to attach to an interior face of the bulb body via the corresponding adhesive;
   contracting the expandable member from the expanded state toward the contracted state; and
   removing the expandable member from the bulb body.

13. The method of claim 12, further comprising:
   after the step of removing the expandable member from the bulb body, electrically connecting power conversion circuitry with electrical traces carried by each of the flexible circuit strips.

14. The method of claim 12, further comprising:
   after the step of removing the expandable member from the bulb body, applying a closure over the open end of the bulb body.

15. The method of claim 14, wherein the closure includes an exteriorly threaded cap.

16. The method of claim 12, wherein the expandable member is a balloon.

17. The method of claim 16, wherein the balloon has a predetermined shape in the expanded state corresponding with a shape of the bulb body.

18. The method of claim 12, wherein each of the flexible circuit strips includes stress-relieving notches, and further wherein the step of expanding the expandable member includes the flexible circuit strips deforming in a region of the stress-relieving notches to conform to a shape of the interior face of the bulb body.

19. The LED light bulb device of claim 1, wherein all of the LEDs associated with at least one of the plurality of flexible circuit strips are arranged to aim inwardly relative to the bulb body.

* * * * *